United States Patent
Yoro

(10) Patent No.: US 8,970,526 B2
(45) Date of Patent: Mar. 3, 2015

(54) INPUT INSTRUCTION PROCESSING DEVICE, COMMUNICATION SYSTEM THEREFOR, COMPUTER PROGRAM THEREFOR, AND INFORMATION RECORDING MEDIUM THEREWITH

(75) Inventor: Daisuke Yoro, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 279 days.

(21) Appl. No.: 13/598,870

(22) Filed: Aug. 30, 2012

(65) Prior Publication Data

US 2013/0065683 A1 Mar. 14, 2013

Related U.S. Application Data

(62) Division of application No. 12/680,385, filed as application No. PCT/JP2008/067388 on Sep. 26, 2008, now Pat. No. 8,313,375.

(30) Foreign Application Priority Data

Sep. 28, 2007 (JP) ................... 2007-253471
Sep. 28, 2007 (JP) ................... 2007-253472

(51) Int. Cl.
*G06F 3/0482* (2013.01)
*A63F 13/40* (2014.01)
*G06F 3/0488* (2013.01)

(52) U.S. Cl.
CPC ............ *A63F 13/10* (2013.01); *G06F 3/0482* (2013.01); *G06F 3/04883* (2013.01); *A63F 2300/1075* (2013.01); *A63F 2300/6045* (2013.01); *A63F 2300/8011* (2013.01)
USPC .................. 345/173; 463/31; 463/37

(58) Field of Classification Search
CPC ........... A63F 13/2145; A63F 2300/308; A63F 2300/1075; G06F 3/01; G06F 3/03; G06F 3/041; G06F 3/048; G06F 3/0481; G06F 3/04812; G06F 3/04815; G06F 3/04817; G06F 3/0482; G06F 3/0484; G06F 3/04842; G06F 3/04886
USPC ............... 463/31, 32, 33, 34, 37, 40; 345/173
See application file for complete search history.

(56) References Cited

U.S. PATENT DOCUMENTS

| 6,094,197 A | 7/2000 | Buxton et al. |
| 6,354,940 B1 * | 3/2002 | Itou et al. .................. 463/8 |

(Continued)

FOREIGN PATENT DOCUMENTS

| CN | 1845051 A | 10/2006 |
| JP | 7-200126 A | 8/1995 |

(Continued)

OTHER PUBLICATIONS

Japanese Office Action, Application No. 2009-534395, dated Sep. 11, 2012.

(Continued)

*Primary Examiner* — Damon Pierce
(74) *Attorney, Agent, or Firm* — Sughrue Mion, PLLC

(57) ABSTRACT

The present invention provides a game device that has a touch panel, a processor, and a RAM. The processor, from among detected position data output from touch panel, stores in RAM, as the position of the start point, the position indicated by detected position data output by the start of a continuous touch operation. Also, given that the position indicated by detected position data output immediately before the end of the continuous touch operation is determined as the position of the end point, processor identifies, from among plural input instructions each being associated with plural direction ranges extending radially from a common basal point on the contact face of touch panel, an input instruction that is associated with a direction range having a direction from the start point to the end point therewithin, from among plural direction ranges having the start point as a basal point.

17 Claims, 15 Drawing Sheets

(56) References Cited

U.S. PATENT DOCUMENTS

| | | |
|---|---|---|
| 2002/0093491 A1 | 7/2002 | Gillespie et al. |
| 2006/0003838 A1 | 1/2006 | Kobayashi et al. |
| 2006/0227106 A1 | 10/2006 | Hashimoto et al. |

FOREIGN PATENT DOCUMENTS

| | | |
|---|---|---|
| JP | 11-506559 A | 6/1999 |
| JP | 2000-231446 A | 8/2000 |
| JP | 2002-328871 A | 11/2002 |
| JP | 2006-014954 A | 1/2006 |
| JP | 2007-029442 A | 2/2007 |
| JP | 3910890 B2 | 2/2007 |
| WO | 2007-013247 A1 | 2/2007 |

OTHER PUBLICATIONS

Japanese Office Action dated Jan. 21, 2014 issued in Japanese Application No. 2012-242364.

Taiwanese Office Action corresponding to Taiwanese Patent Application No. 097137410, dated Dec. 28, 2011.

Chinese Office Action dated Jul. 25, 2012 issued in Chinese Application No. 200880108797X.

International Search Report mailed Jan. 6, 2009 in International Application No. PCT/JP2008/067388.

* cited by examiner

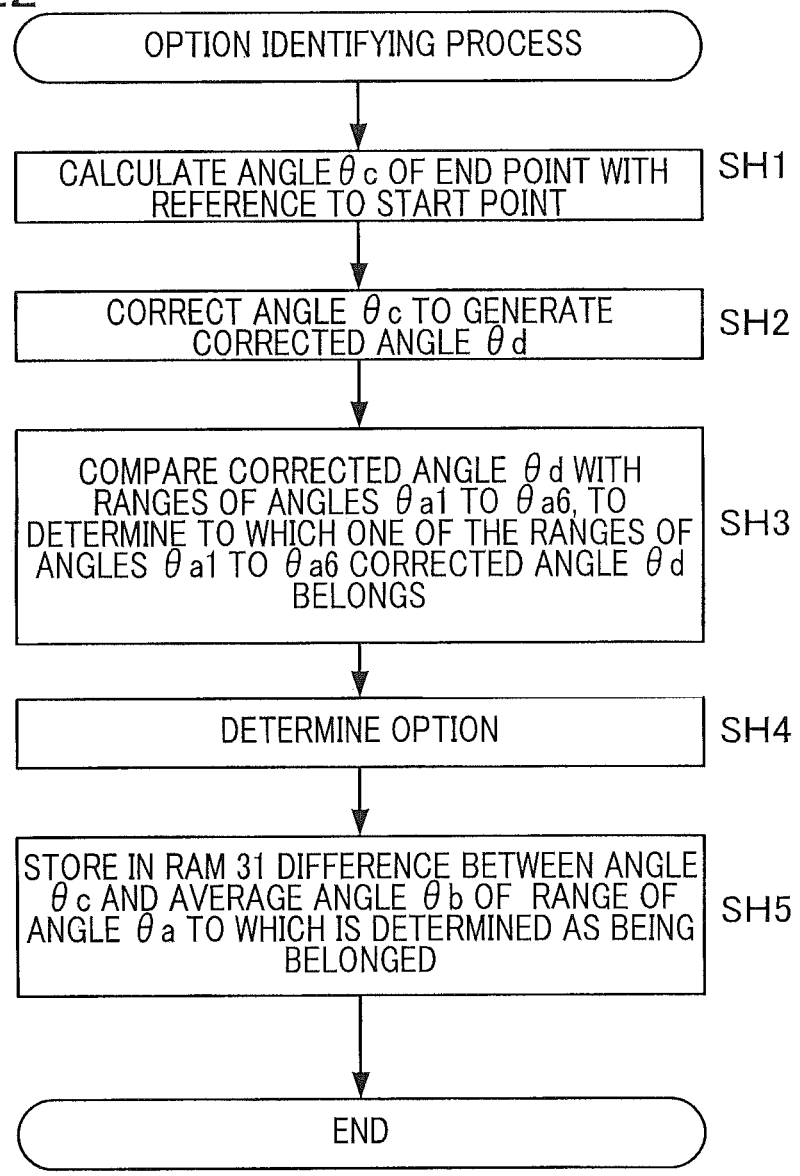

INPUT INSTRUCTION PROCESSING DEVICE, COMMUNICATION SYSTEM THEREFOR, COMPUTER PROGRAM THEREFOR, AND INFORMATION RECORDING MEDIUM THEREWITH

CROSS-REFERENCE TO RELATED APPLICATIONS

This is a continuation of pending U.S. application Ser. No. 12/680,385 filed Mar. 26, 2010, which is the National Stage Entry of PCT/JP2008/067388, filed on Sep. 26, 2008, which claims priority to Japanese Application Nos. 2007-253471 and 2007-253472, each filed on Sep. 28, 2007. The entire disclosures of each of which is incorporated herein by express reference thereto.

TECHNICAL FIELD

The present invention relates to an input instruction processing device for performing a process corresponding to a user input instruction that has been input by a user by using a touch panel, and relates to a communication system having this input instruction processing device, and further relates to a computer program for causing an input instruction processing device to execute a process according to the present invention and an information recording medium having stored thereon this computer program.

BACKGROUND ART

There is known, as a method for inputting an input instruction into an input instruction processing device, a method in which multiple options of input instructions that can be input by a user are displayed by a first touch operation at a touch panel and in which, when one of the options is selected by a second touch operation, this option is input as an input instruction (refer to Japanese Patent Publication 3910890).

DISCLOSURE OF INVENTION

In the above method, however, a user of an input instruction processing device must touch the touch panel twice to input an input instruction by selecting it from multiple options for input instructions. Accordingly, the present invention has, as objects, to reduce the time and inconvenience for the task of inputting an input instruction by selecting it from multiple options for input instructions in an input instruction processing device at which a process corresponding to a user input instruction that was input by a user by using a touch panel is performed.

Description will first be given of terms used in this specification.

A "game" is an activity involving some rules for determining a result of a play (game play) such as soccer, quizzes, and puzzles. The "game" includes a multiple-player game in which two or more participant players or two or more participant teams compete or cooperate and a single-player game in which a participant player plays a game to achieve an object or for enjoyment, i.e., a one-person game, and a puzzle.

A "play" of a game is a single act of a player performing a game. Therefore, in a single game, plural plays can be repeated by the same player, and plural plays may be performed simultaneously by plural players. A person who can perform each play is called a "player" of the play or game. Therefore, even if a person has not played a game in the past or is not currently playing a game, the person who may potentially play a game is sometimes called a player. However, a player who is actually playing a game and has played a game, in particular, is called a "participant player (participating player)" of the play. In each play, a "result" of the play is an evaluation which a participant player of the play has as an object. Examples of results of a play include win or loss, a rank, and a score.

A game includes a single-player type game in which the number of participant players in one play of the game is one and a multiple-player type game in which the number is more than one. Examples of a multiple-player type game include an individual-evaluation type game in which a result of each play is determined for each participant player of the play, and a team-evaluation type game in which a result of each play is determined for each participant team being a group of participant players of this play. Furthermore, as a multiple-player game, a competition type game may be mentioned in which, in each play, participant players of the play or participant teams of the play compete with one another, or a cooperation type game in which participant players or participant teams cooperate with one another. A competition type game includes a match-up game in which participant players or participant teams go against one another.

A game can be implemented as a computer game. A "computer game" is a game for which a play is carried out by a computer. A computer used for carrying out a computer game is called a "game terminal" for the computer game. Among game terminals for a computer game is a "game terminal" which has a user interface for operation by a player of the computer game. A system that has a game terminal for a computer game is called a "game system" for the computer game.

A place at which a game terminal is installed is called a "game place" or "venue". Examples of a game place include a facility at which visitors use the installed game terminal by paying a fee (for example, a game arcade) and a residential household at which a game terminal is installed. In the former, a visitor in most cases will be a user of a game terminal and will be a player of a computer game; and in the latter, a resident in most cases will be a user of a game terminal and will be a player of a computer game. In the former, a game terminal that has a function of collecting fees from its user (a type of commercial-use game machine) is installed in most cases; and in the latter, a game terminal that does not have a function of collecting fees from its user (a type of household use game machine) is installed in most cases.

Examples of a game apparatus or a game system include one in which the number of executable computer games is one, or is one in which the number is multiple. Examples of a game system is one that has only a single game terminal, one that has multiple game terminals, and one that has multiple game apparatuses. Examples of a game system having plural game apparatuses include a game system (network-type game system) that uses a network to which every game apparatus belongs as a node.

A "network" has terminations and is a system in which data can be transmitted and received among plural terminal nodes belonging to the system. Included as an example of a network is a network in which a communication address unique to this network (for example, an IP address (Internet Protocol address)) is assigned to each terminal node belonging to the network. The communication address is used to transmit and receive data among terminal nodes. A "terminal node" is one that serves as a termination of a network from among nodes belonging to the network to which the terminal node belongs. A "node" is an apparatus or a system that transmits or receives data within a network to which the node belongs. Examples of a node include a computer and a network. A network including plural networks as plural nodes is called an "internetwork". Examples of an internetwork include the Internet.

Examples of a network-type game system having plural game terminals include a master-slave type game system, a server-client type game system, and a peer-to-peer type game system. Examples of a server-client type game system include a game system in which a server game apparatus and a client game terminal are statically determined, a game system in which both are dynamically determined, and a game system involving a game terminal concurrently working as a server and a client.

A "computer" or a "computer system" is, from among apparatuses for processing data, one that has a memory (storage device) for storing data and a processor for executing a computer program or a computer program element stored in the memory. "Data" represents information in a form that is recognizable by a machine such as a computer. Examples of data include data electrically representing information, data magnetically representing information, and data optically representing information. "Information" is an object of a process that can be represented by data. The "memory" is a device that readably stores data written therein. Examples of the memory include a semiconductor memory, a magnetic memory, and an optical memory. A "computer program" or "computer program element" is a generic term for, from among collections of data representing instructions, a collection designating the procedure of a process. Examples of a computer program or a computer program element include a program for causing a computer to carry out a procedure of a computer game when the program is run by the computer. A "processor" is a device that executes a computer program by performing a process of executing instructions represented by data in the computer program in accordance with a procedure indicated by the computer program, the computer program being a collection of data representing instructions. Examples of a processor include a single CPU (Central Processing Unit) and a collection of plural CPUs.

Examples of a computer or a computer system include a computer provided with an interface with the outside. Examples of an interface with the outside include: an input unit for receiving input information or data from the outside and an output unit for outputting information or data to the outside. Examples of the input unit include a sensor, a touch panel, an operation button, and a keyboard. "To output" information is to represent information represented by data in such a way that information can be perceived by a human. Examples of ways in which information can be perceived by a human include by light, by sound, and by vibration. Examples of outputting information by light include displaying images and blinking of lights. Examples of outputting information by sound include emitting sounds by a speaker and driving a sound structure by a solenoid (for example, ringing a bell). Examples of outputting information by vibration include oscillation by an oscillator.

A player's "intention or wish" includes emotions, feelings, states of mind, willingness, resolution, ideas, and other psychological actions.

Description will next be given of the present invention.

The present invention provides an input instruction processing device for performing a process in accordance with a user input instruction from a user, the input instruction processing device having a storage device that stores written data; a touch panel that has a planar contact face and that, in a case in which a touch operation contacting the contact face is performed by the user, detects a position of a portion in the contact face touched by the touch operation to output detected position data showing a detected position; a display that displays an image on the contact face; a position record processor that causes the storage device to store, as start position data showing a position of a start point, a position indicated by detected position data output from the touch panel by the start of a continuous touch operation, and that causes the storage device to store, as end position data showing a position of an end point, a position indicated by detected position data output from the touch panel immediately before the continuous touch operation ends, the continuous touch operation being a touch operation in which contact at the contact face continues from the start point to the end point; an option display controller that controls the display to display an option group image in which plural option images are arranged around a position indicated by the start position data stored in the storage device, each option image showing an option of an input instruction that can be input by the user; an identifier that performs an identifying process of identifying one of the plural options as the user input instruction based on the start position data and the end position data stored in the storage device; and a first input instruction processor that performs a process in accordance with the user input instruction identified by the identifier.

According to this input instruction processing device, its user can input an input instruction, for example, by simply sweeping and lifting a portion that is in contact with the contact face. Therefore, the time and inconvenience for the task of inputting an input instruction by selecting it from multiple options can be reduced.

According to one embodiment of the present invention, in the option group image, each of the plural option images may be displayed corresponding to each of at least two of plural direction ranges extending radially from the position indicated by the start position data as the common basal point so as not to overlap with one another, and the identifier may identify, as the user input instruction, an option represented by an option image displayed within a direction range, from among the direction ranges, that includes a direction from the start point to the end point.

In this case, because plural option images in the option group image are displayed, being associated respectively with at least two of plural direction ranges extending radially with the position indicated by the start position data as a common basal point so as not to overlap with one another, an option image indicated by the continuous touch operation can be reliably identified as a user input instruction.

In another embodiment, the plural direction ranges may be given as ranges of angles of polar coordinates with reference to the start point, and the identifier may have a range storage device that stores each of the ranges of angles for each of the plural options; a calculator that calculates, on the basis of the start position data and the end position data, the angle of the end point with reference to the start point; a corrector that corrects the angle calculated by the calculator; a determiner that, by comparing the angle corrected by the corrector and each of the ranges of the angles stored in the range storage device, determines to which of the ranges of the angles the corrected angle belongs; and a decider that identifies, based on a result of the determination of the determiner, an option represented by the option image as the user input instruction, and the corrector may calculate, for each of the continuous touch operations, a difference between the angle calculated by the calculator and an average angle of the range of the angle to which it is determined by the determiner that the corrected angle belongs, calculates the average of the differences calculated for each of the continuous touch operations as a correction angle, and corrects the angle calculated by the calculator by using the correction angle.

According to this embodiment, after the angle of the end point with reference to the start point is calculated, the angle is corrected based on a tendency in the movement of a user's finger in the continuous touch operation, and an option is identified based on the corrected value. Therefore, the erroneous input caused by the tendency in the movement of a user's finger can be reduced.

In yet another embodiment, the identifier may perform the identifying process only in a case in which the distance between the start point and the end point falls within a predetermined distance range. According to the input instruction processing device, the erroneous input can be reduced because not only is the determination performed based on the direction range but also on the distance range.

In another embodiment, the plural options may be associated with plural icons that cause visual effects that are different from one another when the icons are displayed, and the first input instruction processor may include a first display controller that controls the display so that, as the process in accordance with the user input instruction, an icon corresponding to an option identified by the user input instruction is displayed. In this case, a user can cause different icons to be displayed using the touch panel.

In the above input instruction processing device, during a period in which the continuous touch operation is continuing, the touch panel may sequentially output plural sets of detection position data showing plural detected positions on a path that the continuous touch operation has followed, and the input instruction processing device may further have a timer that measures an elapsed time since the touch panel most recently output the detected position data; a timer controller that causes the timer to start measuring the elapsed time every time detected position data is output from the touch panel; a provisional position record processor that updates a position indicated by the detected position data in the storage device in a case in which the detected position data is output from the touch panel after the start position data is stored in the storage device; and an end determiner that determines that the continuous touch operation has ended in a case in which the elapsed time exceeds a predetermined permissible time, and the position record processor, in a case in which it is determined by the end determiner that the continuous touch operation has ended, may determine the position stored in the storage device by the provisional position record processor as the detected position data that is output immediately before the continuous touch operation ends.

According to an input instruction processing device of this embodiment, because it is determined that a continuous touch operation is continuing even in a case in which a portion that is in touch with the contact face is briefly lifted from the contact face, the erroneous input can be reduced.

This input instruction processing device may further have an input unit for inputting information from the outside; a background image generator that generates a background image based on the information input to the input unit, the background image being displayed as a background of the option group image; and a background display controller that controls the display to stop displaying the option group image in a case in which detected position data corresponding to the end position data is output from the touch panel and to display the background image regardless of whether the option group image is displayed.

According to the input instruction processing device of this mode, the display of an option image ends when detected position data indicating the position of the end point is output from the touch panel, a period in which the background image is less visible can be shortened.

In this input instruction processing device, the plural options may be associated with plural icons that cause visual effects that are different from one another when the icons are displayed, and the background image generator may further generate the background image including at least one of the plural icons based on the user input instruction identified by the identifier in addition to the information input to the input unit, or the input instruction processing device may further have a transmitter that transmits, to the outside, data showing a user input instruction identified by the identifier; and a receiver that receives data from the outside, and the background image generator may generate the background image based on the data received by the receiver in addition to the information input to the input unit. According to the input instruction processing device of the former case, a user can confirm the details of the input instruction that was input. According to the input instruction processing device of the latter case, by using a plurality of this device, a process corresponding to an input instruction input to one input instruction processing device can be performed at another input instruction processing device.

Furthermore, a communication system according to the present invention has plural input instruction processing devices for performing a process in accordance with a user input instruction from a user, each of the plural input instruction processing devices including: a storage device that stores written data; a touch panel that has a planar contact face and that, in a case in which a touch operation contacting the contact face is performed by the user, detects a position of a portion in the contact face touched by the touch operation to output detected position data showing a detected position; a display that displays an image on the contact face; a position recorder that causes the storage device to store, as start position data showing a position of a start point, a position indicated by detected position data output from the touch panel by the start of a continuous touch operation and that causes the storage device to store, as end position data showing a position of an end point, a position indicated by detected position data output from the touch panel immediately before the continuous touch operation ends, the continuous touch operation being a touch operation in which the contact to the contact face continues from the start point to the end point; an option display controller that controls the display to display an option group image in which plural option images are arranged around a position indicated by the start position data stored in the storage device, each option image showing an option of an input instruction that can be input by the user; an identifier that performs an identifying process of identifying one of the plural options as the user input instruction based on the start position data and the end position data stored in the storage device; a transmitter that transmits, to another input instruction processing device of the plural input instruction processing devices, data showing the user input instruction identified by the identifier as first notification data; a receiver that receives, from the another input instruction processing device, second notification data showing a user input instruction of the another input instruction processing device; a first input instruction processor that performs a process in accordance with the user input instruction identified by the identifier; and a second input instruction processor that performs a process in accordance with the user input instruction of the another input instruction processing device shown by the second notification data received by the receiver.

A user of this communication system can input a desired input instruction, for example, simply by sweeping and lifting a portion that is in touch with the contact face of a touch panel. Therefore, the time and inconvenience for the task of inputting an input instruction by selecting it from plural options can be reduced. Furthermore, because the input instruction processing device notifies an input instruction that was input by using a touch panel to another input instruction processing device, and also receives data of a user input instruction identified by another input instruction processing device, the input instruction processing device not only can perform a process corresponding to an input instruction that was input at this input instruction processing device but also can perform a process corresponding to a user input instruction identified at an input instruction processing device which is a correspondent in communication. Thus, an input instruction that a user of a correspondent input instruction processing device opponent has input is reflected in this input instruction processing device. Therefore, according to this communication system, an input instruction can be input with a minimum of time and inconvenience, and at least two users can have reflected input instructions on each other's devices.

In one embodiment, in the option group image, each of the plural option images are displayed corresponding to each of at least two of plural direction ranges extending radially from the position indicated by the start position data as the common basal point and extending so as not to overlap with one another, and the identifier may identify, as the user input instruction, an option represented by an option image displayed within a direction range, from among direction ranges, that includes a direction from the start point to the end point. In this case, because plural option images in the option group image are displayed, being associated respectively with at least two of plural direction ranges extending radially with the position indicated by the start position data as a common basal point so as not to overlap one another; an option image indicated by the continuous touch operation can reliably be identified as a user input instruction.

In another embodiment, the identifier, in a case in which any of the plural option images is not associated with a direction range including the direction from the start point to the end point, may determine that the user input instruction has selected a null option. According to the communication system of this embodiment, even in a case in which the number of displayed options decreases, the same options correspond to the same direction ranges. Therefore, the erroneous input can be reduced.

In the above communication system, the plural options may be associated with plural icons that cause visual effects that are different from one another when the icons are displayed, and the first input instruction processor may include a first display controller that controls the display so that, as the process in accordance with the user input instruction, an icon corresponding to an option identified by the user input instruction is displayed.

According to the communication system of this embodiment, an icon corresponding to an option selected by a user is displayed on the input instruction processing device of this user. Therefore, a user can select an option easily and accurately.

In the above communication system, the input instruction processing device may further have an association changer that changes association between options and icons, or the plural options are a part of many candidates for options, and the input instruction processing device may further have a first option determiner that determines, as the plural options, options that have been specified by the user from among the many candidates for options. According to the communication system of these embodiments, user customization is possible.

In the above communication system, the plural options may be a part of many candidates for options, and the input instruction processing device may be a game terminal of a computer game and may further have a second option determiner that determines, as the plural options, options that match a play situation of the computer game from among the many candidates for options. According to the communication system of this embodiment, a situation is avoided in which an icon not suited for a play situation is displayed.

The present invention provides a computer program or a computer program element and a computer-readable information recording medium having recorded the computer program or the computer program element thereon, the computer program or the computer program element for causing a computer to perform a process in accordance with a user input instruction from a user, the computer having a storage device that stores written data and being connected to a touch panel and to a display, with the touch panel having a planar contact face and the touch panel, in a case in which a touch operation contacting the contact face is performed by the user, detecting a position of a portion in the contact face touched by the touch operation to output detected position data showing a detected position, and the display displaying an image on the contact face, and the computer is caused to execute: a position record process of causing the storage device to store, as start position data showing a position of a start point, a position indicated by detected position data output from the touch panel by the start of a continuous touch operation and that causes the storage device to store, as end position data showing a position of an end point, a position indicated by detected position data output from the touch panel immediately before the continuous touch operation ends, the continuous touch operation being a touch operation in which the contact at the contact face continues from the start point to the end point; a first display control process of controlling the display to display an option group image in which plural option images are arranged around a position indicated by the start position data stored in the storage device, each option image showing an option of an input instruction that can be input by the user; an identifying process of identifying one of the plural options as the user input instruction based on the start position data and the end position data stored in the storage device; and a first input instruction process of performing a process in accordance with the user input instruction identified by the identifier.

According to this computer program, the time and inconvenience for the task of inputting an input instruction by selecting it from plural options can be reduced. It is to be noted that the present invention can be understood as a transmission medium (for example, a network) for transmitting the computer program. Therefore, the present invention can be understood as a medium (data carrier) for recording the above computer program in a readable way or transmitting the computer program. Furthermore, the present invention can be understood as a computer program element that is a part or whole of the above computer program. The present invention can also be understood as a computer program product having a medium that retains data that becomes the computer program when loaded on a computer.

The computer program or computer program element in the present invention can be executable in a computer or in a computer system, includes instructions (software code portions) for causing the processor of the computer or the computer system to execute a process according to the present invention, when it is executed in a computer or in a computer system, and can cause a general-purpose computer or computer system to serve as a computer or a computer system according to the present invention. Such a computer program or computer program element can be distributed, with data loadable into a memory of a computer system (i.e., computer program) being recorded on a recording medium such as a CD-ROM or a diskette or other types of recording media. Also, the above data carrier includes a recording medium having recorded thereon a computer program according to the present invention. Furthermore, the data carrier may be a data connection or transmission medium for transmitting a signal indicating a computer program according to the present invention, and includes, for example, a telephone line, a wireless communication line, and an electrical communication line such as the Internet.

Effects of the Invention

According to the present invention, it is possible to reduce the time and inconvenience for the task of inputting an input instruction by selecting it from plural options for input instructions in an input instruction processing device at which a process corresponding to a user input instruction input by a user by using a touch panel is performed.

BRIEF DESCRIPTION OF THE DRAWINGS

FIG. 22 is a flowchart showing an option identifying process.

BEST MODE FOR CARRYING OUT THE INVENTION

In the following, description will be given of a preferred embodiment of the present invention with reference to the drawings. The specific configurations described below are merely examples, and the present invention encompasses various embodiments obtained by modifying the specific configurations within its scope.

Configuration of Game System

Figure 1:
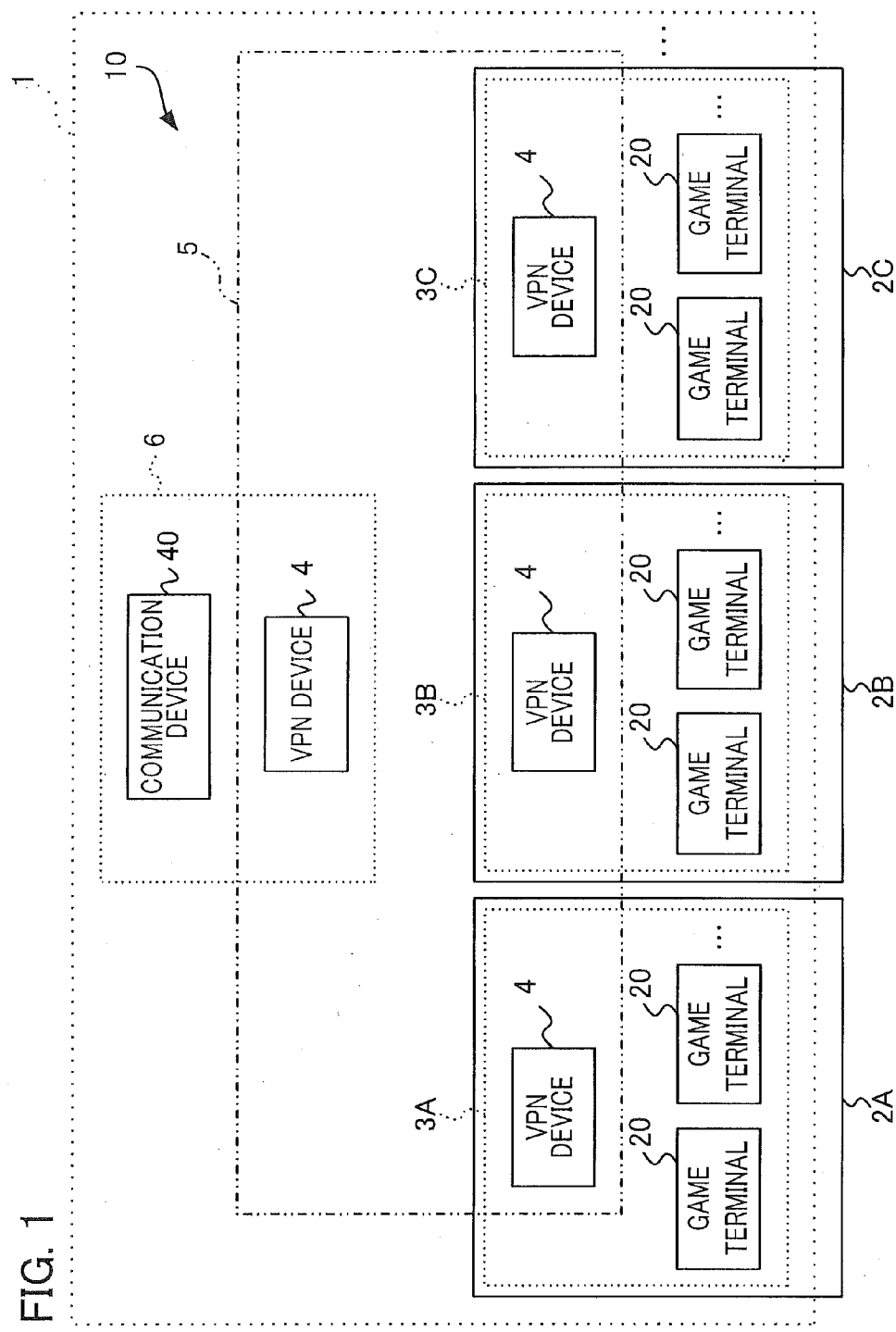
FIG. 1 is a block diagram showing a configuration of a game system according to an embodiment of the present invention.

FIG. 1 is a block diagram showing a configuration of a game system 10 according to an embodiment of the present invention. Game system 10 is a game system for a specific computer game (hereinafter, this will be referred to as a "first game"). The first game is a soccer game in which two players fight against each other, in which play each player operates characters of the team of the player. Each character is an imaginary entity resembling a human. In the following description, from among two players who will be opponent players for each other, one will be called "Player A" and the other will be "Player B".

Game system 10 is a network-type game system and has plural game terminals 20, each belonging to the Internetwork 1 as a terminal node, and a communication apparatus 40 belonging to the Internetwork 1 as a terminal node. The play of the first game advances, with two game terminals 20 communicating with each other. Both game terminal 20 and communication device 40 are computers or computer systems; game terminal 20 is a game terminal of the first game; and communication device 40 is a game device of the first game.

Game terminal 20 is a game terminal for the first game. Plural game terminals 20 each belong to one of plural LANs (Local Area Networks) 3 (3A, 3B, 3C, . . . ) as a terminal node. LAN 3 is a network belonging to the Internetwork 1 as a node. Plural LANs 3 are provided at plural game places 2 (2A, 2B, 2C, . . . ), respectively. Belonging to LAN 3 is a VPN (Virtual Private Network) apparatus 4 as a node. VPN apparatus 4 belonging to LAN 3 belongs to a VPN 5 as a terminal node. VPN 5 is a network virtually created on the Internetwork 1.

Communication apparatus 40 is a computer, belongs to LAN 6 as a terminal node, and performs the matching of an opponent player and retains various data. LAN 6 is a network belonging to the Internetwork 1 as a node, and is provided at a place different from any of the plural game places 2. VPN apparatus 4 belongs to LAN 6 as a node. VPN apparatus 4 belongs to VPN 5 as a terminal node. Communication between each game terminal 20 and communication apparatus 40 is performed via VPN 5.

Configuration of Game Terminal

Figure 2:
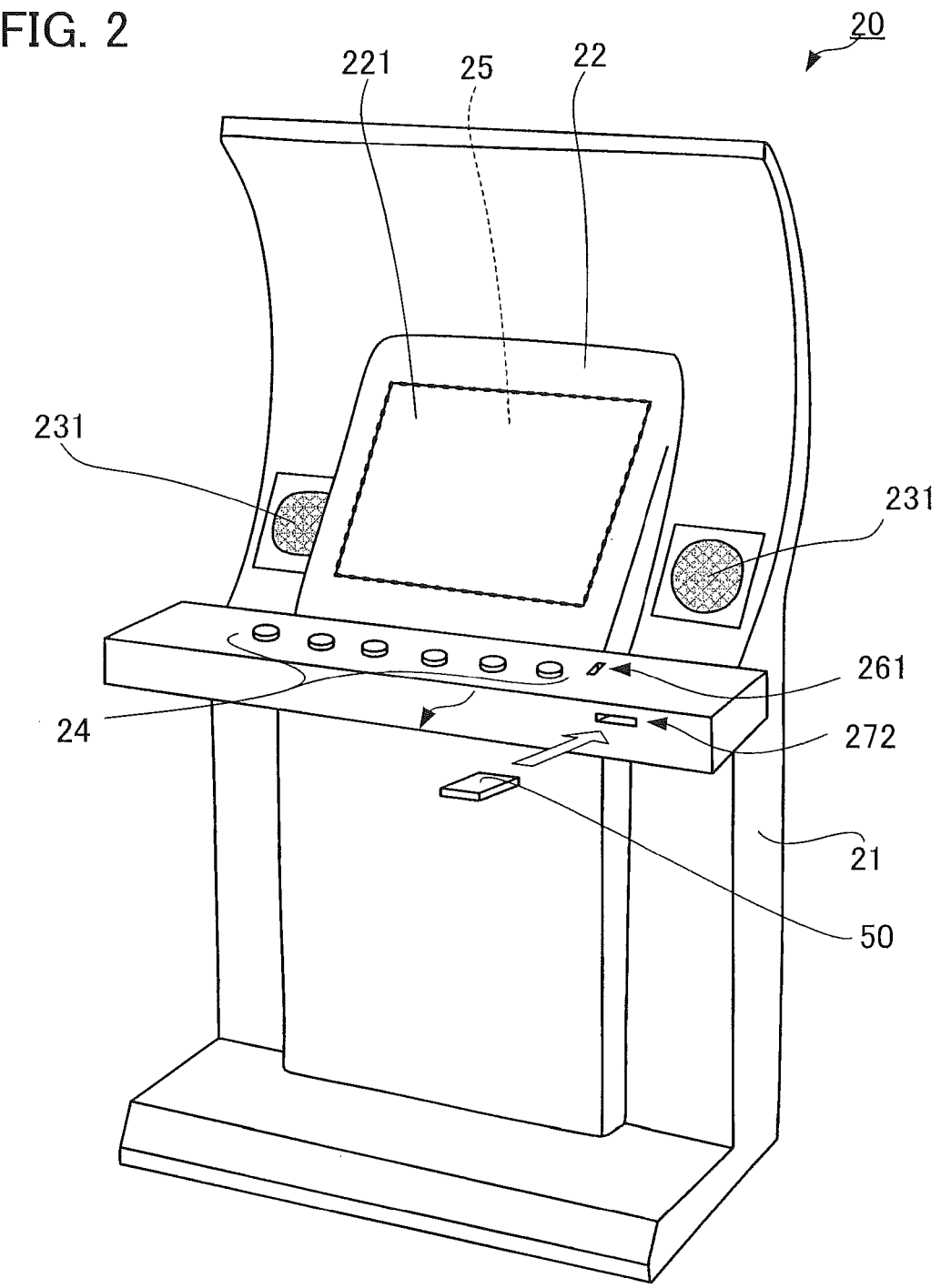
FIG. 2 is a diagram showing an external view of a game terminal in the game system.

FIG. 2 is a diagram showing an external view of game terminal 20 according to an embodiment of the present invention. As is obvious from this figure, a player of the first game operates game terminal 20, facing body 21 of game terminal 20, by looking at an image displayed on screen 221 of display unit (for example, a monitor) 22 of body 21, listening to the sound emitted from speaker 231 provided on body 21, operating operation button group 24 provided on body 21, and touching a transparent touch panel 25 provided in front of screen 221 in such a way that the panel covers screen 221.

Game terminal 20 is a so-called arcade game machine. For the purpose of collecting fees for using game terminal 20, body 21 is provided with a coin acceptance slot 261 for a predetermined coin (for example, hard currency). Furthermore, body 21 is provided with a medium acceptance slot 272 for a recording medium 50 having recorded thereon unique identification data. A player of the first game can possess one or more recording medium 50, and communication device 40 can retain various data for each recording medium 50.

Figure 3:
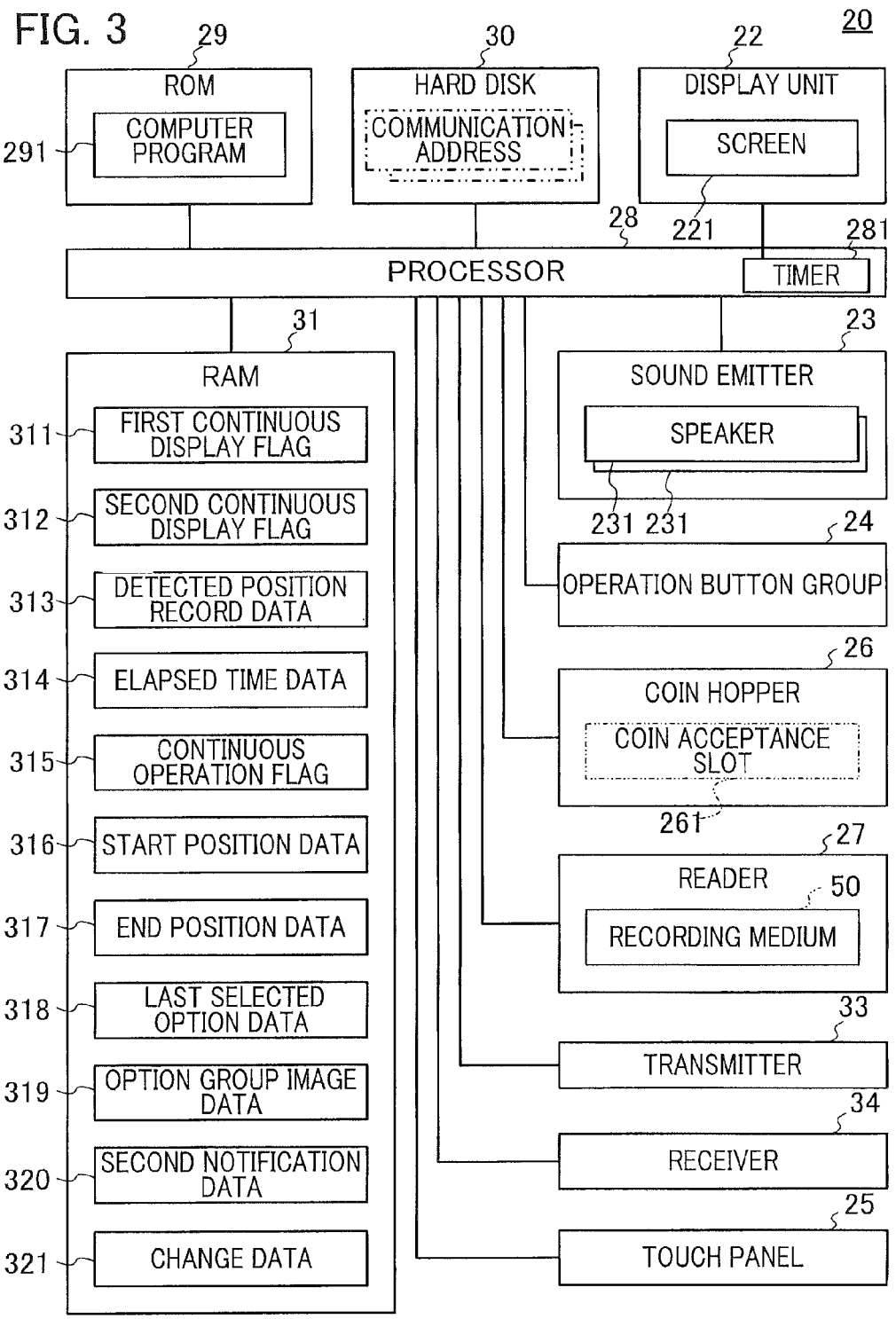
FIG. 3 is a block diagram showing an electrical configuration of the game terminal.

FIG. 3 is a block diagram showing an electrical configuration of game terminal 20. As shown in this figure, game terminal 20 has a display unit 22, a sound emitter 23 having two speakers 231, an operation button group 24, touch panel 25, a coin hopper 26 having a coin acceptance slot 261, a reader 27, a processor 28 that executes various data processes, ROM (Read Only Memory) 29, a hard disk 30, a RAM (Random Access Memory) 31, a transmitter 33, and a receiver 34.

Processor 28 is, for example, one or more CPUs and has a timer 281 for measuring elapsed time. Processor 28 can supply data to display unit 22, sound emitter 23, and transmitter 33, can receive data output from operation button group 24, touch panel 25, coin hopper 26, reader 27, and receiver 34, can read data from ROM 29, hard disk 30, and RAM 31, and can write data into hard disk 30 and RAM 31.

Display unit 22 uses data supplied from processor 28 to display an image represented by this data on screen 221. Because touch panel 25 is transparent, when display unit 22 displays an image on screen 221, the same image will be displayed on the contact face of touch panel 25. Sound emitter 23 uses data supplied from processor 28 to cause sound represented by this data to be emitted from two speakers 231. Transmitter 33 transmits data supplied from processor 28 to the outside, and receiver 34 receives data from the outside to supply the data to processor 28.

A computer program 291 is held in ROM 29. Computer program 291 is a computer program for the first game and is executed by processor 28. Furthermore, ROM 29 has a rewritable non-volatile memory area, and in this memory area, many candidates for options are stored as candidates for plural options displayed as an option image on an option group image G1 (described later). Therefore, plural option images displayed in option group image G1 (FIG. 18) show plural options as a part of many candidates for options. RAM 31 is a storage device for storing written data, and temporarily stores various data. As data temporarily stored therein, there are first continuous display flag 311, second continuous display flag 312, detected position record data 313, elapsed time data 314, continuous operation flag 315, start position data 316, end position data 317, last selected option data 318, option group image data 319, second notification data 320, and change data 321.

Operation button group 24 (input unit) outputs operation data corresponding to the content of an operation. More specifically, operation button group 24 is a collection of plural operation buttons, and each operation button, when pressed down, outputs unique operation data. Coin hopper 26 distinguishes coins inserted from a coin acceptance slot 261, and the hopper accepts a coin if the coin is of a predetermined type and supplies data indicating that the coin has been accepted. Reader 27, when a recording medium 50 is inserted in medium acceptance slot 272, reads identification data from this recording medium 50 for output. Furthermore, reader 27, when recording medium 50 is ejected from medium acceptance slot 272, starts a recording medium ejection process (described later). For example, in a case in which recording medium 50 is of a card type, reader 27 is a card reader.

Touch panel 25 has a planar contact face, and when a touch operation to the contact face is performed by a player who is a user of this game terminal 20, detects a position (touch position) of a portion of the contact face that was touched, to output detected position data showing the detected touch position. Processor 28, every time detected position data is output from touch panel 25, causes timer 281 to start measuring elapsed time. The contact face of touch panel 25 can be screen 221, but in the present embodiment, touch panel 25 is placed in front of screen 221, and the front surface of a portion of touch panel 25 (a portion that overlaps screen 221) is a contact face.

A player, by performing a continuous touch operation at touch panel 25, can input one input instruction by using touch panel 25. The "continuous touch operation" is a touch operation in which a state in which a contacting portion (for example, the fingertip of a player) is in touch with the contact face of touch panel 25 continues from a start point to an end point. In other words, the continuous touch operation starts when a player of the first game touches the contact face of touch panel 25, and ends when the player lets the contacting portion (for example, the fingertip) off the contact face after sweeping the contacting portion over the contact face without lifting it from the contact face.

While a continuous touch operation is performed by a player, touch panel 25 sequentially outputs plural sets of detected position data indicating plural detected positions on a track which the continuous touch operation has traveled. Therefore, in the continuous touch operation, consecutive detected positions show the locus of this touch operation. Data showing the position of the start point of the locus is start position data 316, and data showing the position of a provisional end point is end position data 317. End position data 317 is updated every time detected position data is output from touch panel 25 after detected position data corresponding to start position data 316 in the continuous touch operation. Then, a continuous touch operation ends when the elapsed time measured by timer 281 from the time at which detected position data was output from touch panel 25 the last time becomes longer than a predetermined permissible time, and the position indicated by end position data 317 at this moment is the position of the end point.

In a continuous touch operation, processor 28 serves as a position record processor that stores, in RAM 31, as start position data 316, a position indicated by detected position data output from touch panel 25 by the start of a continuous touch operation, and that stores, as end position data 317, a position indicated by detected position data output from touch panel 25 immediately before the end of the continuous touch operation.

More specifically, processor 28 serves as a timer controller that causes timer 281 to start measuring elapsed time every time detected position data is output from touch panel 25. Therefore, in a continuous touch operation, timer 281 is a means for measuring elapsed time since touch panel 25 outputs detected position data last time. Furthermore, processor 28 serves as an end determiner that determines that the continuous touch operation has ended in a case in which the elapsed time measured by timer 281 exceeds the predetermined permissible time. Processor 28 serves as a provisional position record processor that updates end position data 317 in RAM 31 with a position indicated by detected position data when detected position data is output from touch panel 25 after start position data 316 is stored in RAM 31. In a case in which it is determined by the end determiner that the continuous touch operation has ended, a position (a position indicated by end position data 317) stored in RAM 31 by the provisional position record processor is detected position data that was output immediately before the end of the continuous touch operation. The above position record processor determines the position indicated by this detected position data as the position of an end point of the consecutive touch operation.

Figure 18:
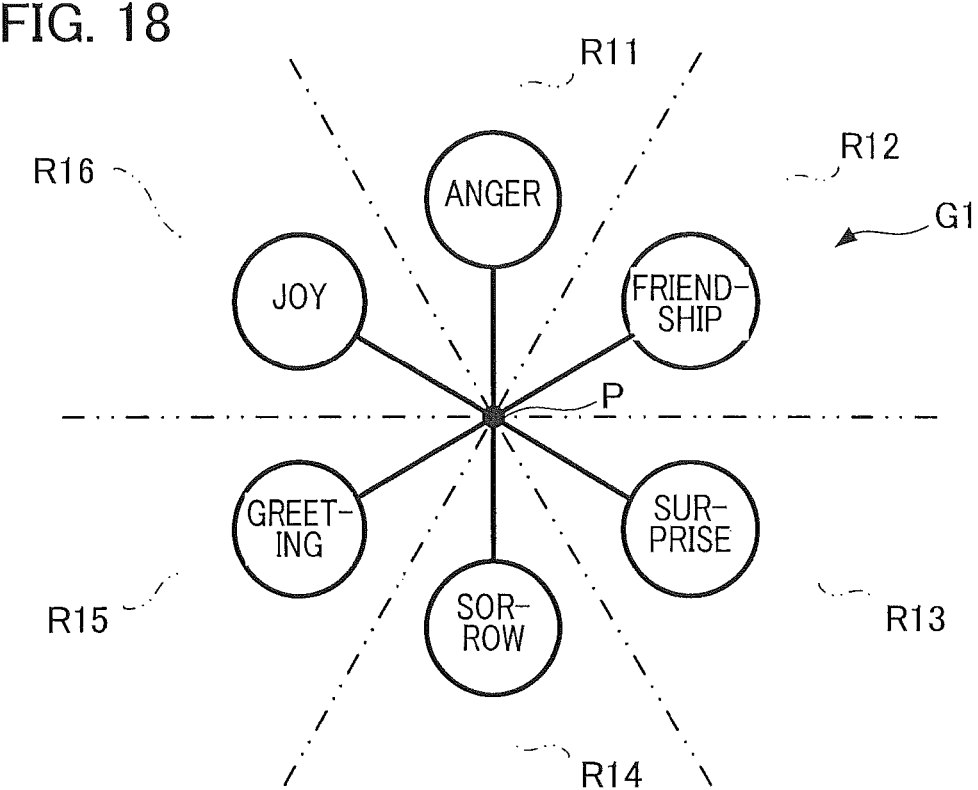
FIG. 18 is a diagram showing a relationship between an option group image displayed on the screen and direction ranges.

Processor 28 causes an option group image to be displayed around a position indicated by start position data 316 of a continuous touch operation. FIG. 18 is a diagram showing an example of option group image G1 displayed on screen 221. As shown in FIG. 18, option group image G1 is an image in which circular option images showing plural options for an input instruction are arranged one by one respectively in plural direction ranges R11 to R16 extending radially from a common basal point, with the direction ranges not overlapping with one another. The option image G1 is displayed in such a way that a basal point P overlaps with a position indicated by start position data 316. In other words, processor 28 serves as an option display controller that controls screen 221 to display an option group image in which plural option images are arranged around a position indicated by start position data 316 stored in RAM 31, the option image representing an option of an input instruction that can be input by a player.

As can be understood from FIG. 18, option group image G1 is for displaying, as plural options for an input instruction, option images indicating an intention which a player can convey to an opponent player, such as "anger", "friendship", "surprise", "sorrow", "greeting", and "joy". For example, an option image in which there is written "ANGER" is an option by which "anger" can be conveyed to the opponent player. A player of the first game, while referring to option group image G1 displayed on screen 221, performs the above continuous touch operation to select one of the plural options. Specifically, the player performs a continuous touch operation, starting with the basal point P of the option group image as a start point, sweeping the player's fingertip toward a direction in which an option image of a desired option is displayed, and lifting the finger from the contact face near the intended image.

In the continuous touch operation, one of the plural options is provisionally selected, and when the continuous touch operation ends without fail, an option that was provisionally selected most recently is selected, whereby this option is regarded as a user input instruction. The data showing the above option group image is option group image data 319. Last selected option data 318 is data indicating an option that was provisionally selected most recently, and is updated every time a provisionally selected option changes in the continuous touch operation. Accordingly, when the continuous touch operation ends, an option indicated by last selected option data 318 will be the selected option.

Plural options indicated by option group images correspond respectively to plural icons. As described above, in the present embodiment, each option indicates by letter the intention of a player that can be conveyed to an opponent player, and each icon respectively corresponding thereto visually indicates the intention of an option indicated by a player by means of pictures. Therefore, for an option showing "anger", for example, an icon that visually represents the emotion of "anger" is associated therewith.

Game terminal 20 is also an input instruction processing device that causes an icon corresponding to an option of an input instruction (hereinafter referred to as a "user input instruction") input by a player by using touch panel 25 to be displayed on this game terminal 20 and game terminal 20 of the opponent player for a certain period of time. Specifically, there are displayed, on screen 221 of game terminal 20, an icon (for example, icon G2 shown in FIG. 16) corresponding to an option for a user input instruction that was input at game terminal 20 and an icon (for example, icon G3 shown in FIG. 17) corresponding to an option for a user input instruction that was input at game terminal 20 of the opponent player. Data showing whether the display of the former icon is continuing is first continuous display flag 311, and data showing whether the display of the latter icon is continuing is second continuous display flag 312. In other words, first continuous display flag 311 is data indicating whether the display of an icon corresponding to an option for a user input instruction input to this game terminal 20 is continuing, and second continuous display flag 312 is data indicating whether the display of an icon corresponding to an option for a user input instruction input to the game terminal 20 of the opponent player is continuing.

In the first game, Player A's user input instruction is notified to game terminal 20 of Player B. In other words, Player A's user input instruction is notified to Player B's game terminal 20 as first notification data via transmitter 33. On the other hand, processor 28, via receiver 34, receives data indicating an input instruction notified from game terminal 20 of the opponent player. This received data is stored as second notification data 320 in RAM 31. Processor 28 performs a process corresponding to an input instruction that was notified from game terminal 20 of the opponent player and is indicated by second notification data 320.

As described above, processor 28 of game terminal 20 serves as a first input instruction processor that performs a process corresponding to the identified user input instruction. Specifically, the processor serves as a first display controller that controls screen 221 so that an icon corresponding to an option identified as a user input instruction is displayed thereon. Also, processor 28 serves as a second input instruction processor that performs a process corresponding to a user input instruction of another game terminal 20, the user input instruction being indicated by second notification data 320 received by receiver 34. Specifically, the processor executes a process (second display control process) of controlling screen 221 so that an icon corresponding to a user input instruction of game terminal 20 of the opponent player is displayed.

Detected position record data 313 is the latest detected position data (i.e., the most recently stored detected position) output from touch panel 25 that has been recorded, and is updated every time detected position data is output from touch panel 25. Elapsed time data 314 is data indicating elapsed time since detected position data that has been recorded as detected position record data 313 was output from touch panel 25, and is updated from moment to moment. Therefore, elapsed time data 314 is data indicating elapsed time since detected position data was output from touch panel 25 for the last time.

Continuous operation flag 315 is data indicating whether a continuous touch operation using touch panel 25 is continuing, and its value will be "true" in a case in which the continuous touch operation is continuing, and will be "false" when it is not. Furthermore, in the first game, from among many candidates for options including the above plural options as a part of the candidates, a player can change options to be displayed as an option group to be displayed on option group image G1, and can change correspondence between options and input instructions. Data showing these changes is change data 321. Change data 321 is delivered from communication device 40.

Hard disk 30 is a rewritable, non-volatile memory, and is used for storing various pieces of information such as the communication address of game terminal 20 having this hard disk 30 and the communication address of communication device 40. It is to be noted that the present embodiment may be modified in such a way that data 311 to 321 and computer program 291 may be stored in hard disk 30. Furthermore, various pieces of information such as the communication address of game terminal 20 or the communication address of communication device 40 may be stored in ROM 29. In this case, hard disk 30 will no longer be necessary. Alternatively, ROM 29 may be replaced with other non-rewritable non-volatile memory, hard disk 30 may be replaced with other rewritable non-volatile memory, and RAM 31 may be replaced with other rewritable volatile memory.

Processor 28, when a power source (not shown) is turned on, executes computer program 291. By this execution, processor 28 performs an initialization process, thereby making each of a change data acquiring process, a recording medium ejection process, a game process, and a change data edit request process separately executable. In the initialization process, processor 28 writes, in RAM 31, data indicating that nothing will be changed, as change data 321.

Configuration of Communication Device

Figure 4:
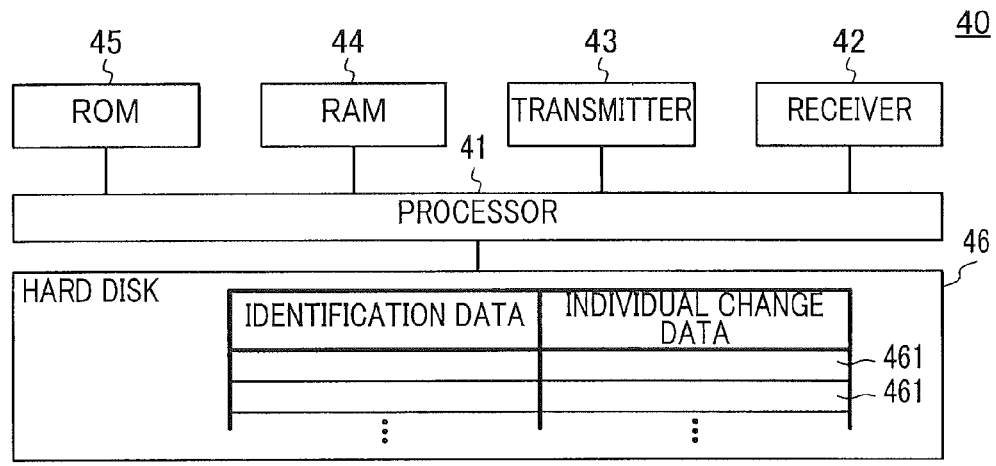
FIG. 4 is a block diagram showing an electrical configuration of a communication device in the game system.

FIG. 4 is a block diagram showing an electrical configuration of communication device 40. As shown in this figure, communication device 40 has a processor 41 that performs various types of data processing, a receiver 42 that receives data from the outside and supplies it to processor 41, a transmitter 43 that transmits data supplied from processor 41 to the outside, a RAM 44, a ROM 45, and a hard disk 46. Processor 41 is, for example, one or more CPUs, can supply data to transmitter 43, can receive data supplied from receiver 42, can read data from RAM 44, ROM 45 and hard disk 46, and can write data in RAM 44 and in hard disk 46.

Each of RAM 31 and hard disk 46 is a storage device that stores written data. RAM 44 is used for temporary storage of various pieces of data. In hard disk 46, individual change data 461 is stored for each recording medium 50 in correspondence with identification data thereof. Individual change data 461 is, unless otherwise edited, data indicating that there will be no change. ROM 45 retains a computer program executed by processor 41. Processor 41, by using this computer program, performs various processes such as a change data edit process of editing individual change data 461.

Change Data Acquiring Process

The change data acquiring process is a process performed at game terminal 20, and is started when identification data of recording medium 50 is output from reader 27. In the change data acquiring process, processor 28 receives the identification data output from reader 27 to write it into RAM 31, and transmits, to communication device 40, a delivery request of change data corresponding to this identification data by means of transmitter 33. Communication device 40, upon receiving this delivery request, replies with individual change data 461 corresponding to the identification data. Processor 28, upon receiving the individual change data 461 by means of receiver 34, writes this individual change data 461 as change data 321 into RAM 31.

Recording Medium Ejection Process

The recording medium ejection process is a process performed at game terminal 20, and is started when recording medium 50 is ejected from medium acceptance slot 272. In the recording medium ejection process, processor 28 of game terminal 20 deletes identification data temporarily stored therein from RAM 31.

Game Process

The game process is a process performed at game terminal 20, and is started when one or plural pieces of coins having monetary value corresponding to the fees for a single play of the first game is inserted into coin acceptance slot 221, and the start button B is pressed down thereafter. In the following, description will be given of the details of the game process. In this description, it is assumed that change data 321 is data indicating that no changes will be made.

Figure 5:
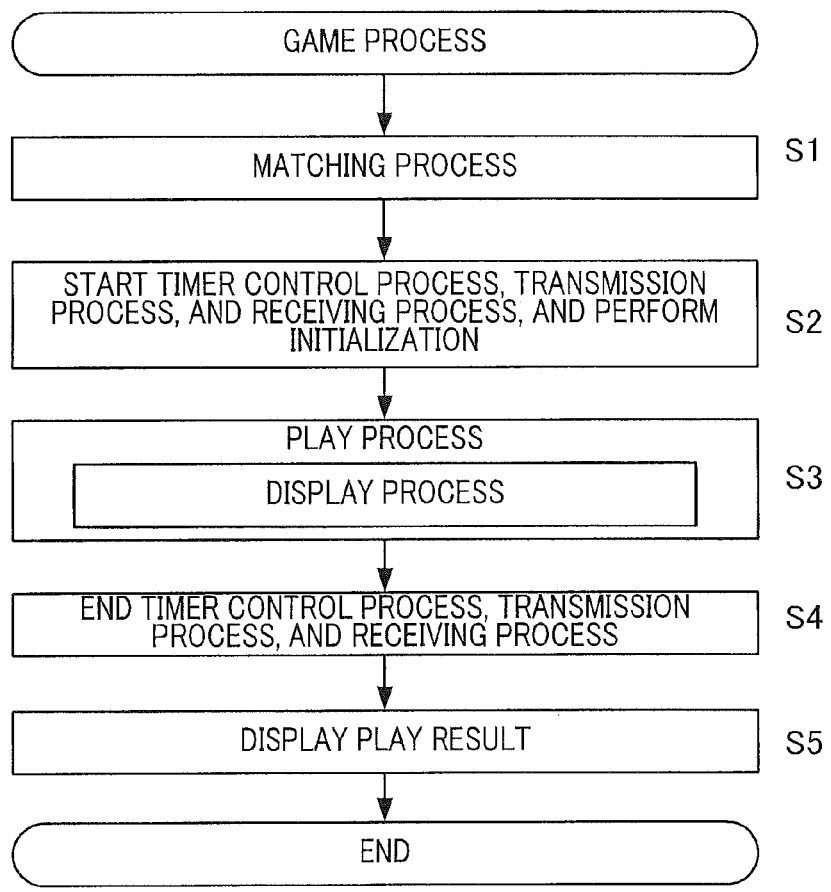
FIG. 5 is a flowchart showing a procedure of a game process performed by a processor of the game terminal.

FIG. 5 is a flowchart showing a procedure of a game process performed by processor 28 of game terminal 20. In the game process, processor 28 first performs a matching process (Si). Specifically, processor 28 first transmits, to communication device 40, by means of transmitter 33, a matching request for requesting matching. Communication device 40 receives a matching request from plural game terminals 20, and performs a task of making a pair of game terminal 20 of Player A and game terminal 20 of Player B, i.e., a matching, and transmits, to each of the matched game terminals 20, the communication address of opponent game terminal 20. Processor 28, upon receiving the communication address of opponent game terminal 20, stores the received communication address in hard disk 30.

Subsequently, processor 28 starts a timer control process (FIG. 7), a transmission process (FIG. 11) and a receiving process (FIG. 12) (S2). These processes will be described later in detail. Furthermore, in Step S2, processor 28 performs an initialization. In this initialization, processor 28 sets "false" to each of first continuous display flag 311, second continuous display flag 312, and continuous operation flag 315. Specifically, data indicating "false" is written in RAM 31 as first continuous display flag 311, second continuous display flag 312, and continuous operation flag 315.

Subsequently, processor 28 performs a play process of executing the procedure of a play of the first game (S3). In game terminal 20 of Player A, processor 28, in the play process, executes in parallel, a process of determining positions and actions (for example, dribbling, passing, etc.) of members of Player A's team in an imaginary soccer field based on operation data from operation button group 24, a process of transmitting this operation data to Player B's game terminal 20, a process of determining, based on data received by means of receiver 34, positions and actions of members of Player B's team in an imaginary space, a process of determining the position of a soccer ball, a process of causing sound emitter 23 to emit various sound effects, a process of calculating a score and ending a play in accordance with the rules of a soccer game, and a display process of causing display unit 22 to periodically display an image.

Figure 6:
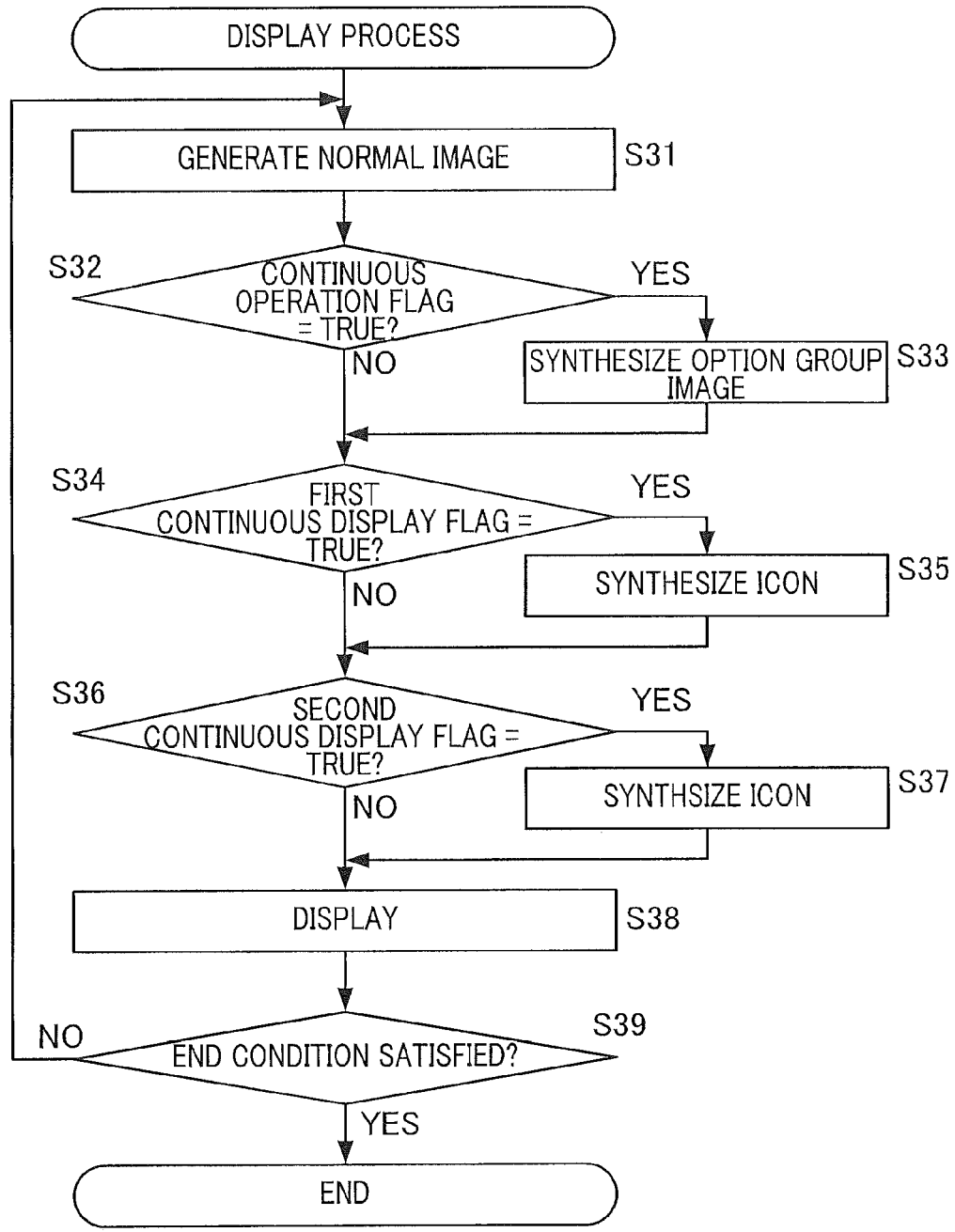
FIG. 6 is a flowchart showing a procedure of a display process performed by the processor.

FIG. 6 is a flowchart showing a procedure of the display process performed by processor 28. In the display process, processor 28 first generates a normal image as an image to be displayed on screen 221 (S31). Specifically, the processor generates normal image data representing the normal image, to write it into RAM 31. The normal image is an image which is normally displayed in a play of the first game, and includes an image of an imaginary soccer field, an image showing First Half or Second Half, an image showing elapsed time from the start of the play, an image showing the name of Player A, an image showing the name of Player B, and an image showing the score.

Processor 28 of game terminal 20 of a player can acquire the name of this player in a freely selected way. For example, the name of a player may be recorded in recording medium 50 carried by this player, may be stored in communication device 40 in association with identification data, or may be input by the player by operating operation button group 24 of the game terminal 20. Likewise, processor 28 of game terminal 20 of a player can acquire the name of an opponent player in a freely selected way. For example, in Step S1 or S2, the name of an opponent player may be notified from communication device 40 by communication, or in Step S2, may be notified from game terminal 20 of the opponent player by communication.

Subsequently, processor 28 determines whether continuous operation flag 315 is "true", the flag indicating whether a continuous touch operation by a player is continuing (S32). In a case in which a result of the determination is YES, processor 28 synthesizes an option group image with the normal image (S33). Specifically, the processor, based on the normal image data, option group image data 319, and start position data 316 stored in RAM 31, generates data showing an image in which the option group image is synthesized with the normal image, to write this generated data as display image data into RAM 13. In this case, the normal image and the option image are synthesized in such a way that, in the normal image, the position indicated by start position data 316 is the basal point P of the option group image. The method of synthesizing images can be freely selected; however, in an area occupied by the option group image, the option group image should preferably be given priority. When the process of Step S33 ends, or when a result of the determination Step S32 changes to NO, the process advances to Step S34.

In Step S34, processor 28 determines whether first continuous display flag 311 is "true", the flag indicating whether the display of an icon corresponding to an option for a user input instruction that was input to this game terminal 20 is continuing. In a case in which a result of the determination is YES, processor 28 synthesizes an icon corresponding to the user input instruction with the normal image (S35). The method of identifying a user input instruction will be described later. When the process of Step S35 ends, or when a result of the determination in Step S34 changes to NO, the process advances to Step S36.

In Step S36, processor 28 determines whether second continuous display flag 312 is "true", the flag indicating whether the display of an icon corresponding to an option for a user input instruction input to game terminal 20 of the opponent player is continuing. In a case in which a result of the determination is YES, processor 28 synthesizes an icon corresponding to second notification data 320 with the normal image (S37). When the process of Step S37 ends, or when a result of the determination in Step S36 changes to NO, the process advances to Step S38.

In Step S38, processor 28 causes display unit 22 to display a display image represented by display image data. Subsequently, processor 28 determines whether a condition for ending the play process (S3) is satisfied (S39). This condition for ending is satisfied when the play of the first game ends. In a case in which a result of the determination in Step S39 is NO, the process returns to Step S31, and in a case in which it is YES, the play process including the display process ends.

Figure 14:
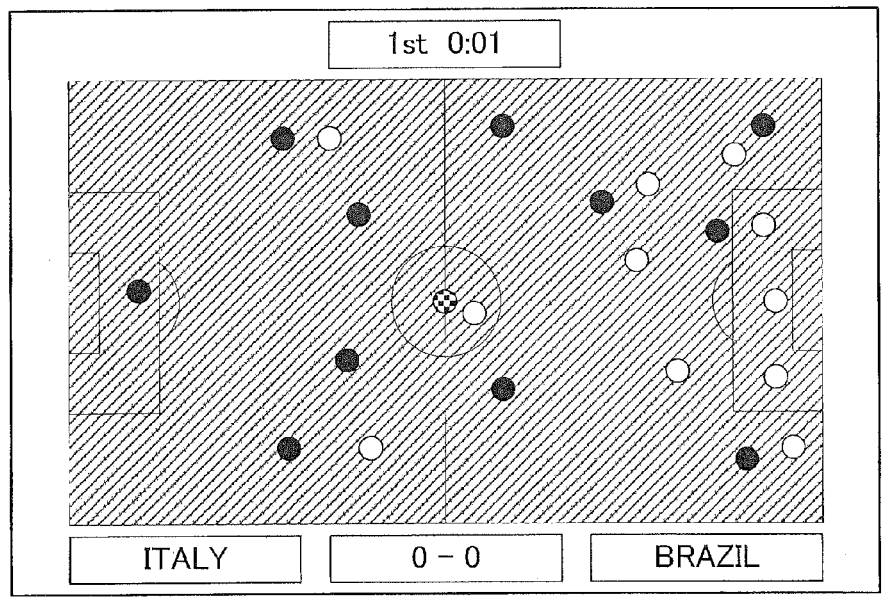
FIG. 14 is a diagram showing an example of an image displayed on a screen of a game terminal of Player B in the play of a first game implemented in a game system.
Figure 15:
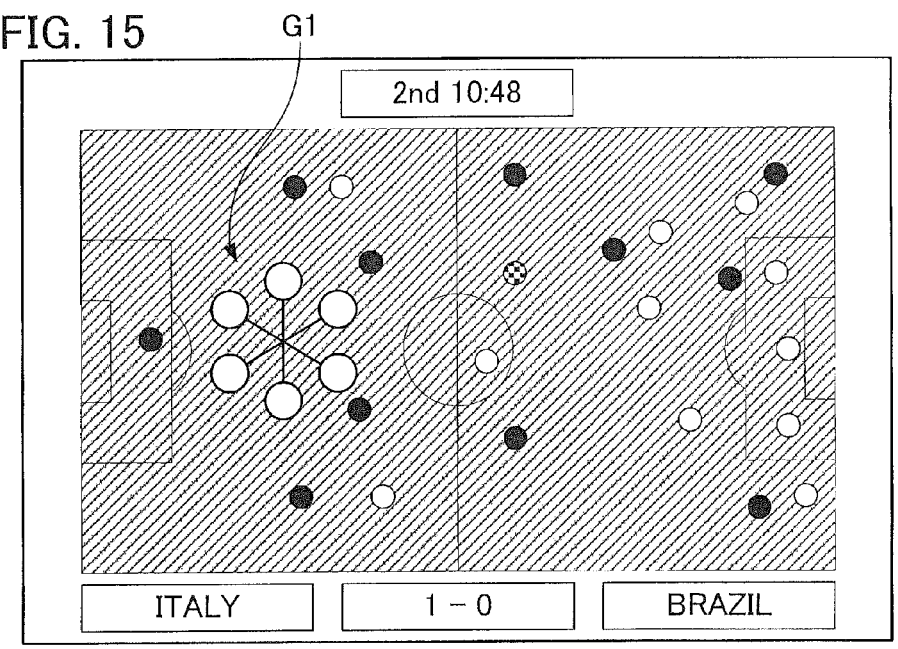
FIG. 15 is a diagram showing another example of an image displayed on the same screen.
Figure 16:
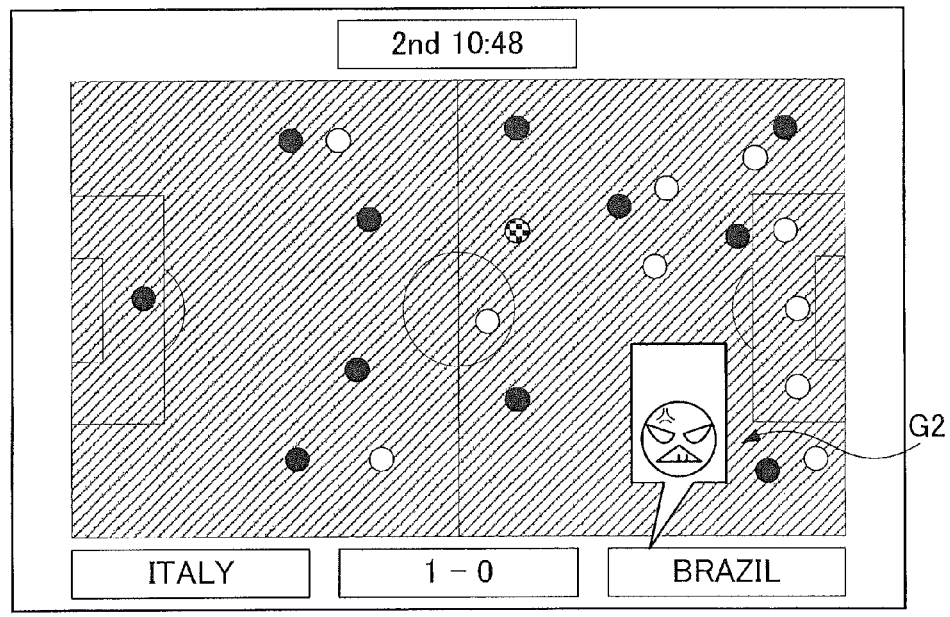
FIG. 16 is a diagram showing yet another example of an image displayed on the same screen.
Figure 17:
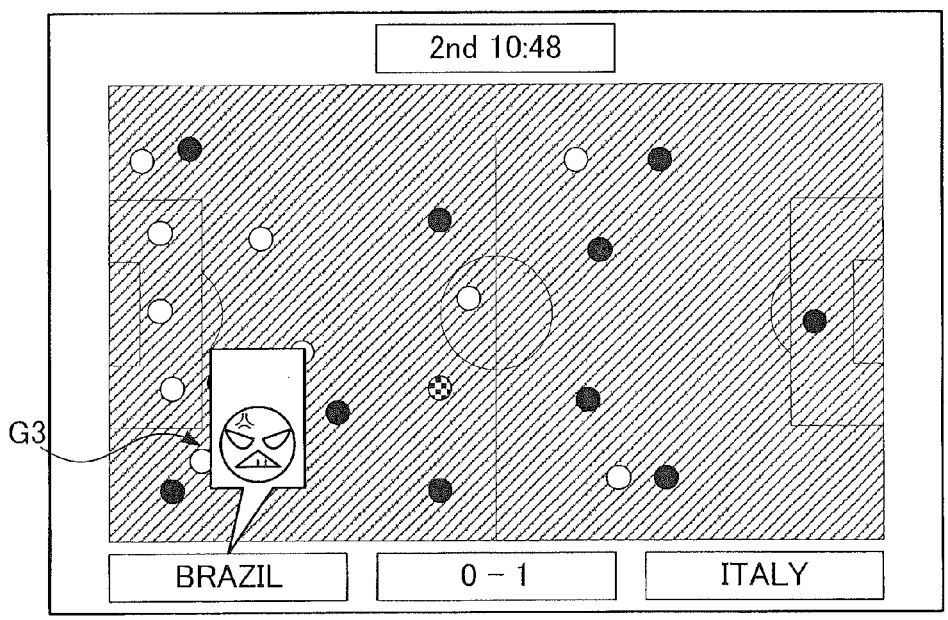
FIG. 17 is a diagram showing an example of an image displayed on a screen of a game terminal of Player A in the play of the first game implemented in a game system.

In the play process, a display, such as exemplified as follows, is performed. For example, in a case in which continuous operation flag 315, first continuous display flag 311, and second continuous display flag 312 are "false", an image (normal image) such as shown in FIG. 14 will be displayed on screen 221 of game terminal 20. For example, in a case in which continuous operation flag 315 is "true", and first continuous display flag 311 and second continuous display flag 312 are "false", an image such as shown in FIG. 15 (a synthesized image of the normal image and option group image G1) will be displayed on screen 221 of this game terminal 20. Furthermore, for example, in a case in which continuous operation flag 315 and second continuous display flag 312 are "false", and first continuous display flag 311 is "true", then an image such as shown in FIG. 16 (a synthesized image of normal image and icon G2) will be displayed on screen 221 of this game terminal 20. Furthermore, for example, in a case in which continuous operation flag 315 and first continuous display flag 311 are "false", and second continuous display flag 312 is "true", an image such as shown in FIG. 17 (a synthesized image of normal image and icon G3) will be displayed on screen 221. FIGS. 14 to 16 each is an image displayed on screen 221 of game terminal 20 of Player B, and FIG. 17 is an image displayed on screen 221 of game terminal 20 of Player A.

In FIGS. 14 to 17 are shown an image of an imaginary soccer field in the center portion of screen 221, an image indicating First Half/Second Half and elapsed time since the start of the soccer game in the upper portion of screen 221, and an image indicating the name of Player A, an image indicating the name of Player B, and an image indicating the score in the lower portion of screen 221. In the imaginary soccer field, the members (11 black dots) of a team of Player A and the members (11 white dots) of a team of Player B, and a soccer ball are arranged. The name of the player of this game terminal 20 is displayed on the right portion of screen 221 of this game terminal 20, and the name of the opponent player is displayed on the left portion of screen 221.

Furthermore, as shown in FIG. 15, option group image G1 is displayed at a position within screen 221 corresponding to start position data 316. Option group image G1 is, as is shown enlarged in FIG. 18, an image in which images (for example, a circular image corresponding to an input instruction for conveying "anger" to an opponent player) of plural options for input instructions are arranged one by one in plural direction ranges R11 to R16 extending from the common basal point P in such a way that the direction ranges do not overlap with one another.

Furthermore, as shown in FIG. 16, an icon G2 corresponding to a user input instruction of game terminal 20 is displayed around the image of the name of the player of this game terminal 20 in screen 221 of this game terminal 20 (first display control process). Similarly, as shown in FIG. 17, an icon G3 corresponding to second notification data 320 retained in RAM 31 of game terminal 20 is displayed around the image of the opponent player in screen 221 of this game terminal 20 (second display control process).

When the play process (S3 in FIG. 5) ends, processor 28 ends the timer control process, the transmission process, and the receiving process (described later) (S4). Processor 28 then causes display unit 22 to display a result of the play in the immediately previous Step S3 (S5), and then ends the game process. In Step S5, a play result displayed is, for example, win or loss, or score. When the game process ends, processor 28 is now in a state in which it can execute the change data acquiring process, the recording medium ejection process, the game process, and the change data edit request process separately.

Timer Control Process

Figure 7:
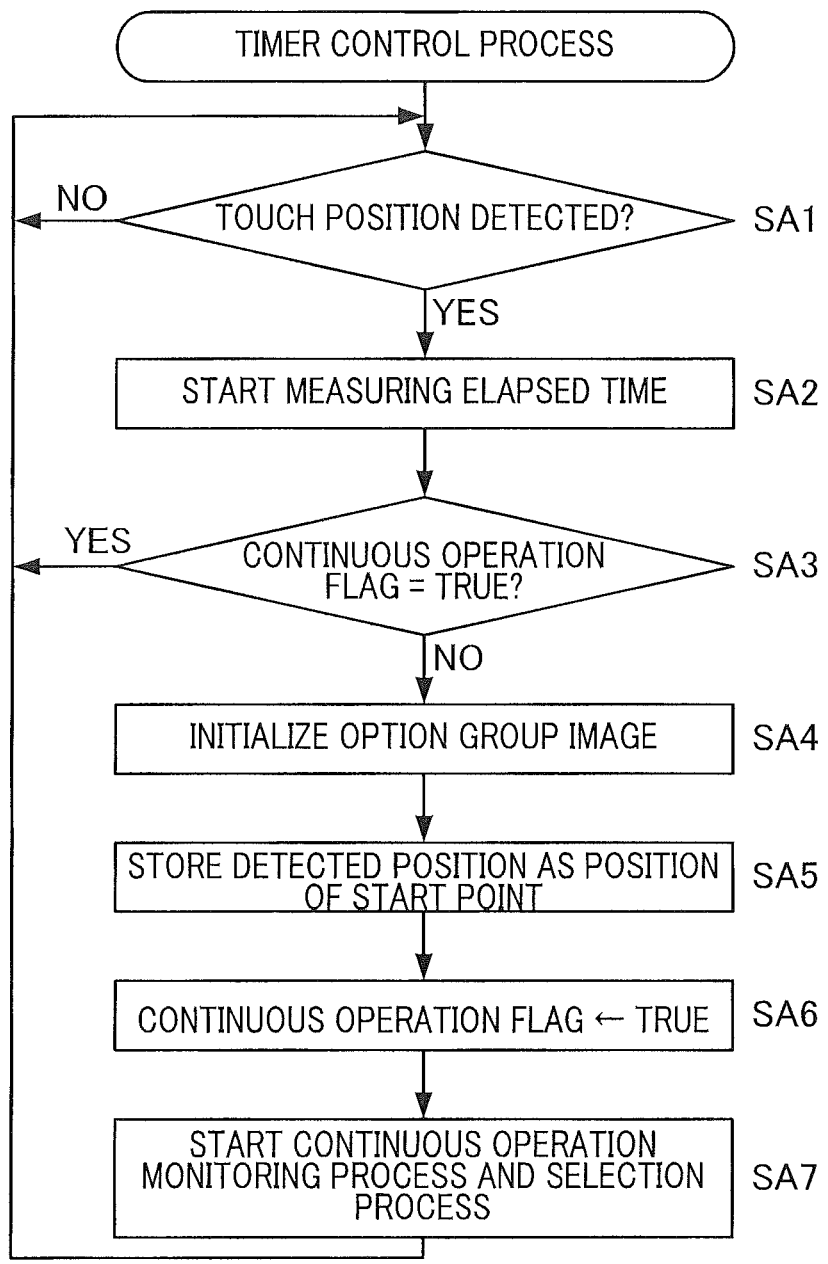
FIG. 7 is a flowchart showing a timer control process performed by the processor.

FIG. 7 is a flowchart showing a detailed procedure of the timer control process (S2 in FIG. 5) performed by processor 28. In the timer control process, processor 28 first determines whether the touch position of a touch operation by a player has been detected (SA1). A result of this determination will change to YES in a case in which detected position data is output from touch panel 25. In a case in which a result of the determination in Step SA1 is NO, the process returns to Step SA1. In other words, the process of Step SA1 is repeatedly performed until a touch position is detected.

In a case in which a result of the determination in Step SA1 is YES, processor 28 starts measuring elapsed time by timer 281 (SA2). In this way, elapsed time data 314 is updated from moment to moment. Processor 28 then determines whether continuous operation flag 315 is "true", the flag indicating whether a continuous touch operation using touch panel 25 is continuing (SA3). In a case in which a result of the determination is NO, processor 28 initializes an option group image (SA4). As a result, option group image data 319 will turn to data indicating an option group image obtained by adding changes indicated by change data 321 to a predetermined option group image. In the option group image indicated by this data, no options are highlighted.

Processor 28, after initializing the option group image, stores, in RAM 31, the detected position as the position of a start point (SA5). Specifically, detected position record data 313 is written in RAM 31 as start position data 316. Processor 28 then sets "true" to continuous operation flag 315 (SA6), and starts the continuous operation monitoring process (FIG. 8) and the selection process (FIG. 9), described later (SA7). Hereinafter, the process returns to Step SA1. In other words, every time a position is detected while a continuous touch operation is continuing, this position becomes a position of a start point, and it is determined that a continuous touch operation has started.

Figure 19:
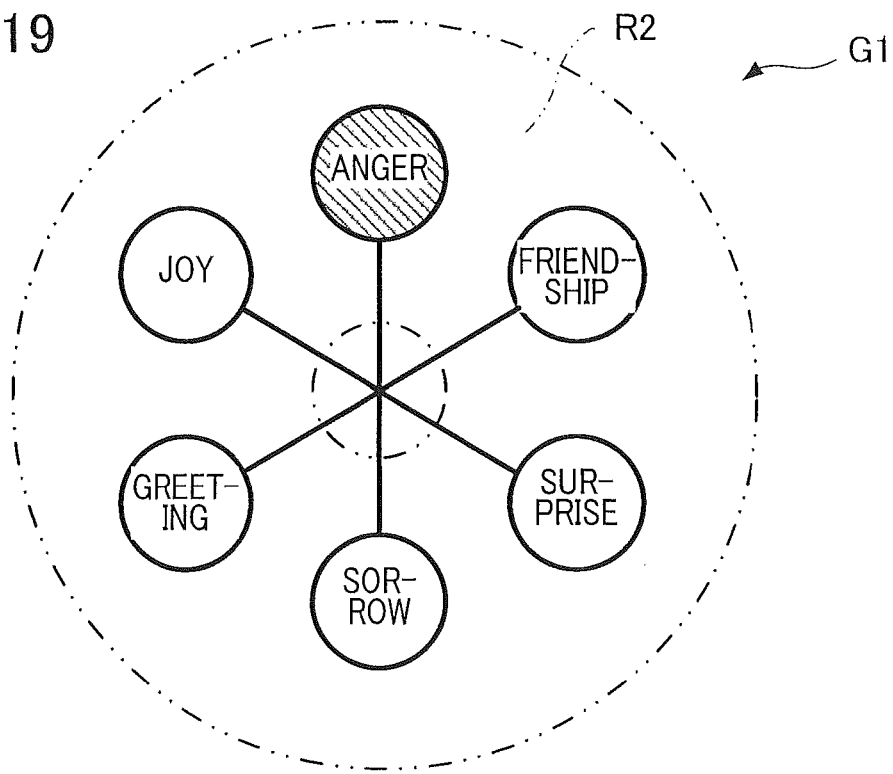
FIG. 19 is a diagram showing a relationship between the option group image and a distance range.

In a case in which continuous operation flag 315 is set to "true", a result of the determination in Step S32 in the display process of FIG. 6 will be YES. Therefore, hereinafter, an image in which an option group image has been synthesized, such as shown in FIG. 15, will be displayed on screen 221 until continuous operation flag 315 is set to "false", i.e., during a continuous touch operation. Furthermore, during this continuous touch operation, in a case in which the last selected option is a null option, an image in which no option is highlighted, such as shown in FIG. 18, is displayed, and in a case in which the last selected option is not a null option, an image in which one of the options (the option of "ANGER" in FIG. 19) is highlighted, such as shown in FIG. 19, is displayed.

On the other hand, in a case in which a result of the determination in Step SA3 in FIG. 7 is YES, i.e., continuous operation flag 315 is set to "true", the process returns to Step SA1. Therefore, even if a touch position is detected in a case in which the continuous touch operation is continuing, this touch position will not be the position of a start point. Furthermore, because the measuring of elapsed time is started in Step SA2 every time a touch position is detected, elapsed time data 314 indicates elapsed time since detected position data was output from touch panel 25 for the last time.

Continuous Operation Monitoring Process

Figure 8:
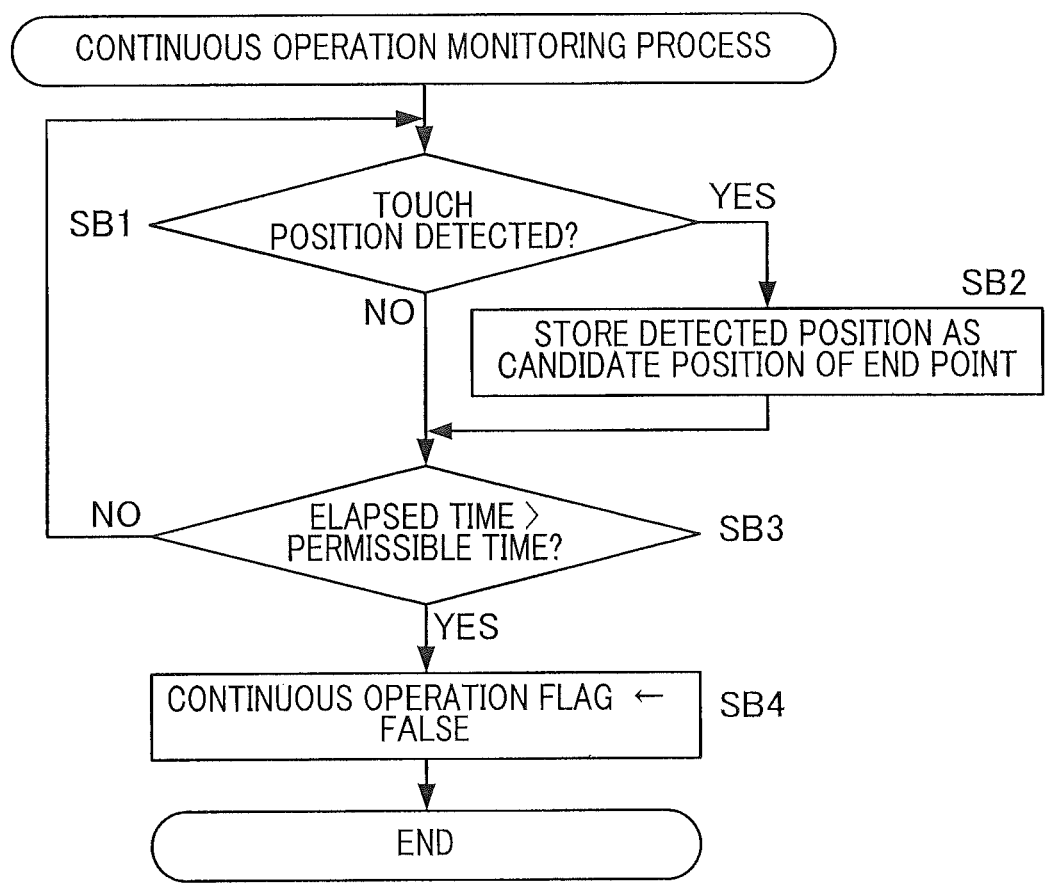
FIG. 8 is a flowchart showing a procedure of a continuous operation monitoring process performed by the processor.

FIG. 8 is a flowchart showing a detailed procedure of the continuous operation monitoring process (Step SA7 in FIG. 7) performed by processor 28. In the continuous operation monitoring process, processor 28 first determines whether a touch position is detected (SB1). In a case in which a result of the determination is YES, processor 28 stores the detected position in RAM 31 as the position of a provisional end point (SB2) (provisional position record process). Specifically, the processor writes, in RAM 31, detected position record data 313 as end position data 317. When the process of Step SB2 ends, or when a result of the determination in Step SB1 changes to NO, the process advances to Step SB3.

In Step SB3, processor 28, based on elapsed time data 314, determines whether the elapsed time is longer than the permissible time (SB3). In a case in which the result of the determination is NO, the process returns to Step SB1. On the other hand, in a case in which the result of the determination in Step SB3 is YES, processor 28 sets "false" to continuous operation flag 315 (SB4), to end the continuous operation monitoring process. Thus, in the continuous operation monitoring process, while elapsed time is equal to or less than the permissible time, every time a touch position is detected, processor 28 stores this position as the position of an end point in RAM 31, and when the elapsed time becomes longer than the permissible time, the processor determines that the continuous touch operation has ended (end determination process). At the end of the continuous operation monitoring process, end position data 317 is no longer a candidate for the end point but becomes data indicating the end point.

Selection Process

Figure 9:
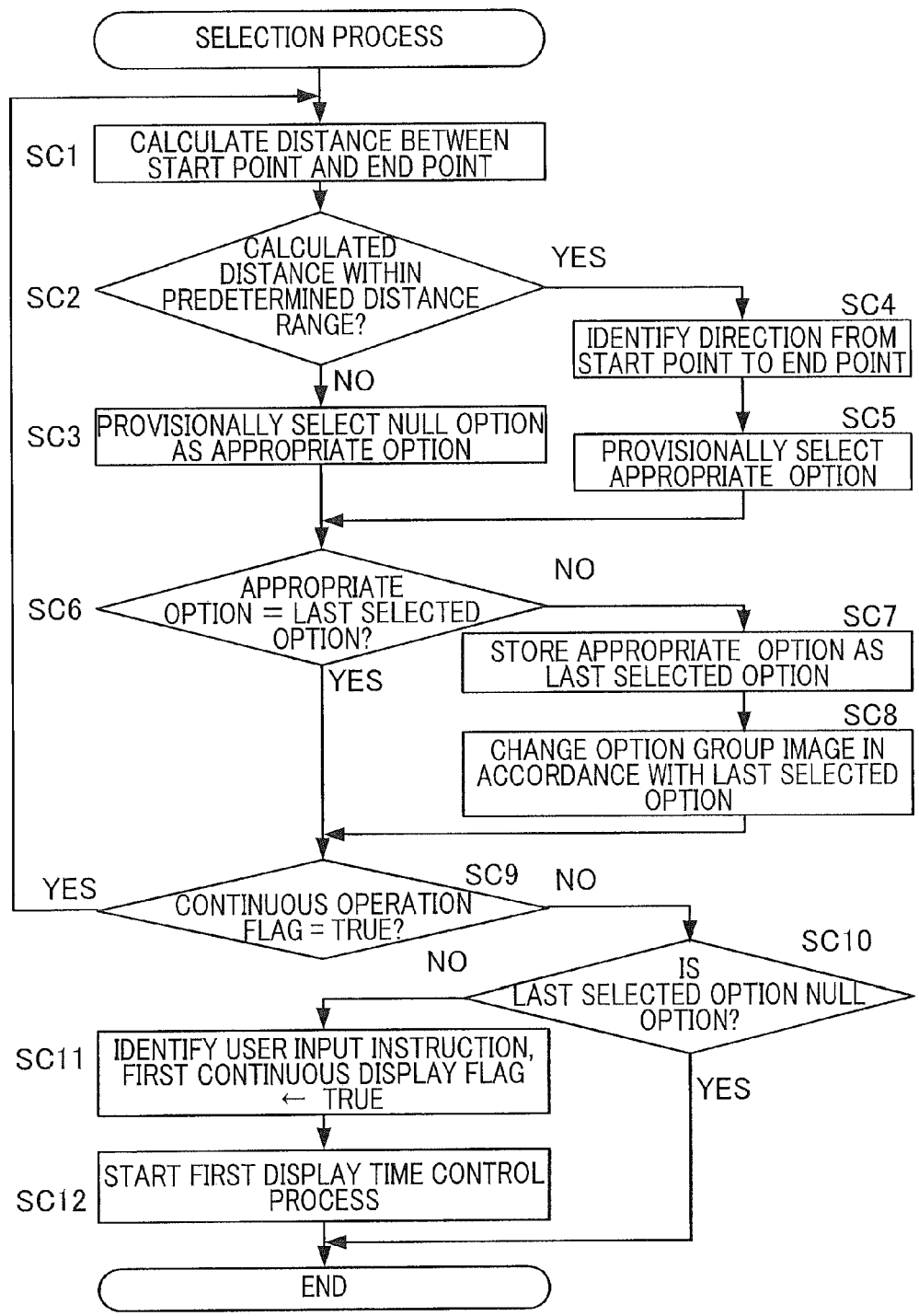
FIG. 9 is a flowchart showing a procedure of a selection process performed by the processor.

FIG. 9 is a flowchart showing a detailed procedure of the selection process (Step SA7 in FIG. 7) performed by processor 28. In the selection process, processor 28 first calculates the distance between the start point and the end point based on start position data 316 and end position data 317 (SC1). Processor 28 then determines whether the calculated distance is within a predetermined distance range R2 (SC2).

FIG. 19 is a diagram showing the relationship between the option group image and distance range R2. As shown in this figure, distance range R2 is a range of distance from the basal point P, and every image of the plural option images included in option group image G1 is arranged within distance range R2. In actuality, distance range R2 is identified by the lower limit and the upper limit, and data showing the lower limit and data showing the upper limit are retained in RAM 31.

In a case in which a result of the determination in Step SC2 is NO, processor 28 determines that a null option is the appropriate option (SC3). Specifically, the null option is determined as the appropriate option, and appropriate option data indicating this option is written into RAM 31. The null option is an option that is null even if it is selected. On the other hand, in a case in which a result of the determination in Step SC2 is YES, processor 28 identifies a direction from the start point to the end point based on start position data 316 and end position data 317 (SC4). Processor 28, having identified the direction, provisionally selects the appropriate option based on the identified direction (SC5). Specifically, the processor determines an option corresponding to a direction range including the direction for the end point therewithin as the appropriate option, and writes appropriate option data indicating this option in RAM 31. However, in a case in which the identified direction is not included in any of the direction ranges, the appropriate option will be a null option.

When a process of Step SC3 or Step SC5 ends, processor 28 determines whether the appropriate option and the last selected option are the same based on the appropriate option data and last selected option data 318 (SC6). In a case in which a result of the determination is NO, processor 28 stores the appropriate option as last selected option in RAM 31 (SC7). Specifically, the appropriate option data is written in RAM 31 as last selected option data 318. Processor 28 then changes an option group image in accordance with the last selected option (SC8). Specifically, option group image data 319 is updated so that only an image of an option indicated by last selected option data 318, from among images of plural options included in the option group image, is highlighted.

On the other hand, in a case in which a result of the determination in Step SC6 is YES, i.e., the appropriate option and the last selected option are the same, or the process of Step SC8 ends, processor 28 determines whether continuous operation flag 315 is "true" (SC9). In a case in which a result of the determination is YES, the process returns to Step SC1. Thus, a process of provisionally selecting the appropriate option is repeated until a continuous touch operation ends, and the appropriate option is changed in this process, the appropriate option, after it was changed, is stored as the last selected option in RAM 31.

In a case in which a result of the determination in Step SC9 changes to NO, processor 28 determines whether the last selected option is a null option based on last selected option data 318 (SC10). In a case in which a result of the determination is NO, processor 28 identifies a user input instruction (SC11). Specifically, the processor identifies an input instruction corresponding to an option indicated by last selected option data 318 as a user input instruction, and writes user input instruction data indicating this input instruction in RAM 31. Furthermore, in Step SC11, processor 28 sets "true" to first continuous display flag 311, the flag causing this game terminal 20 to display an icon corresponding to a user input instruction to this game terminal 20.

Thus, when a continuous touch operation ends, except for a case in which the last selected option is a null option, an input instruction corresponding to the last selected option is identified as a user input instruction. In a case in which first continuous display flag 311 is set to "true", a result of the determination in Step S34 in FIG. 6 changes to YES. Therefore, hereinafter, until first continuous display flag 311 is set to "false", an image in which an icon corresponding to user input instruction data has been synthesized is displayed on screen 221 as shown in FIG. 16. In a case in which a result of the determination in Step SC10 in FIG. 9 changes to YES, or when the process of Step SC11 ends, the first display time control process (SC12) starts, and the selection process ends.

First Display Time Control Process

Figure 10:
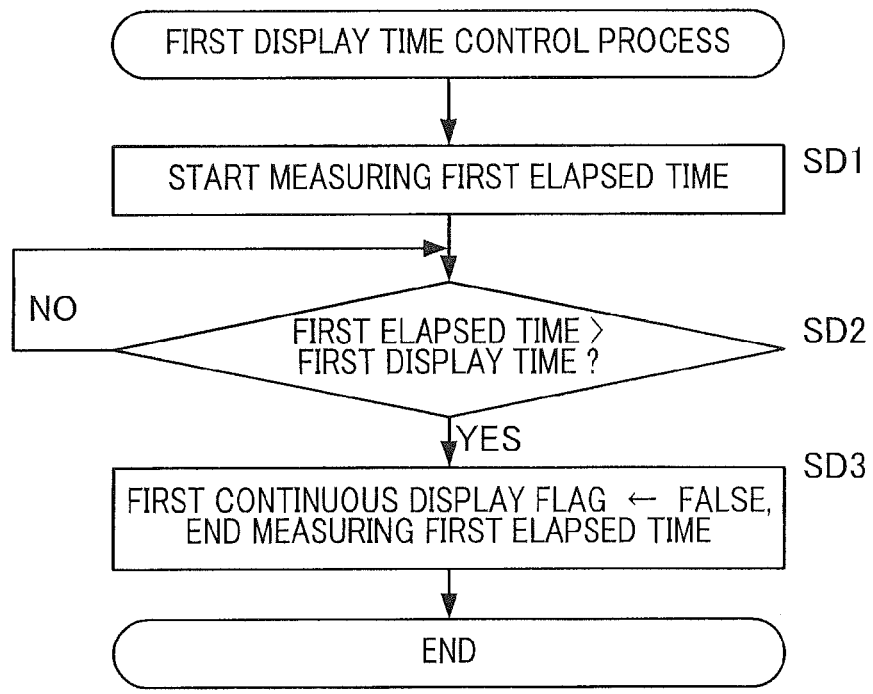
FIG. 10 is a flowchart showing a procedure of a first display time control process performed by the processor.

FIG. 10 is a flowchart showing a detailed procedure of the first display time control process (SC12 in FIG. 9) performed by processor 28. In the first display time control process, processor 28 first starts measuring first elapsed time by timer 281 (SD1). The first elapsed time is elapsed time since the display of an icon corresponding to user input instruction data stored in RAM 31 was started. Processor 28 then determines whether the first elapsed time is longer than a predetermined first display time (SD2). In a case in which a result of the determination is NO, the process returns to Step SD2. On the other hand, in a case in which a result of the determination in Step SD2 is YES, processor 28 sets "false" to first continuous display flag 311, stops measuring the first elapsed time (SD3), to end the first display control process. In other words, first continuous display flag 311 turns "true" only for the first display time.

Transmission Process

Figure 11:
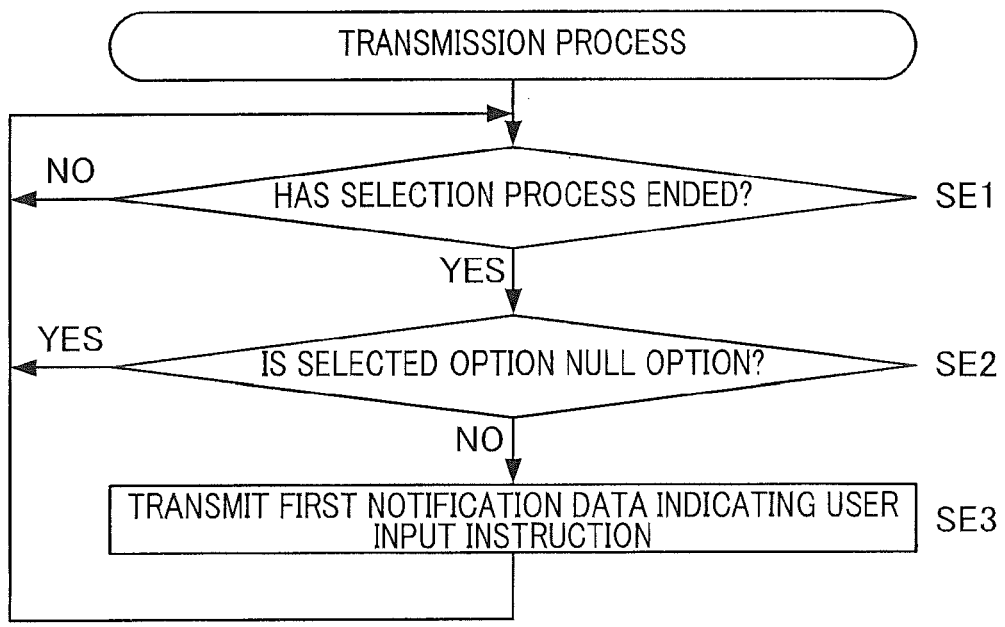
FIG. 11 is a flowchart showing a procedure of a transmission process performed by the processor.

FIG. 11 is a flowchart showing a detailed procedure of the transmission process (S2 in FIG. 5) performed by processor 28. In the transmission process, processor 28 first determines whether the selection process of selecting an option of an input instruction has ended (SE1). In a case in which a result of the determination is NO, the process returns to Step SE1. In a case in which a result of the determination in Step SE1 is YES, processor 28 determines whether the last selected option is a null option based on last selected option data 318 (SE2). In a case in which a result of the determination is YES, the process returns to Step SE1.

In a case in which a result of the determination in Step SE2 is NO, processor 28 transmits first notification data indicating the user input instruction (SE3). Specifically, the processor generates first notification data indicating the user input instruction, to transmit this to game terminal 20 of the opponent player by means of transmitter 33. Hereinafter, the process returns to Step SE1. Thus, when the selection process ends, except for a case in which the last selected option is a null option, first notification data indicating the user input instruction is transmitted to game terminal 20 of the opponent player.

Receiving Process

Figure 12:
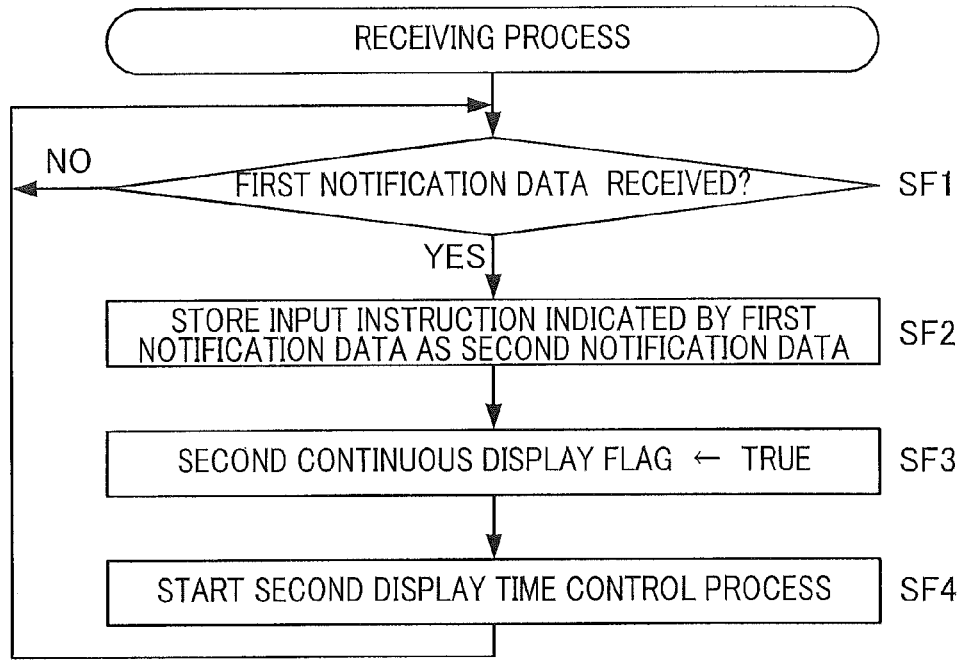
FIG. 12 is a flowchart showing a procedure of a receiving process performed by the processor.

FIG. 12 is a flowchart showing a detailed procedure of the receiving process (S2 in FIG. 5) performed by processor 28. In the receiving process, processor 28 first determines whether it has received first notification data transmitted by game terminal 20 of an opponent player (SF1). A result of this determination changes to YES when the processor receives first notification data from game terminal 20 of the opponent player by means of receiver 34. In a case in which a result of the determination in Step SF1 is NO, the process returns to Step SF1.

In a case in which a result of the determination in Step SF1 is YES, processor 28 stores an input instruction indicated by the received first notification data as the notified input instruction in RAM 31 (SF2). Specifically, the processor writes data indicating an input instruction indicated by the received first notification data as second notification data 320 in RAM 31. The process of Step SF1 is a process of receiving second notification data indicating a user input instruction of game terminal 20 of the opponent player. Processor 28 then sets "true" to second continuous display flag 312 (SF3), and starts the second display time control process described later (SF4). Hereinafter, the process returns to Step SF1.

Every time first notification data is received, an input instruction indicated by the first notification data is identified as the notified input instruction, and it is stored as second notification data 320. In a case in which second continuous display flag 312 is set to "true", a result of the determination in Step S36 in FIG. 6 changes to YES. Therefore, hereinafter, until second continuous display flag 312 is changed to "false", an image in which an icon corresponding to second notification data 320 has been synthesized is displayed on screen 221 as shown in FIG. 17 (the second input instruction process).

Second Display Time Control Process

Figure 13:
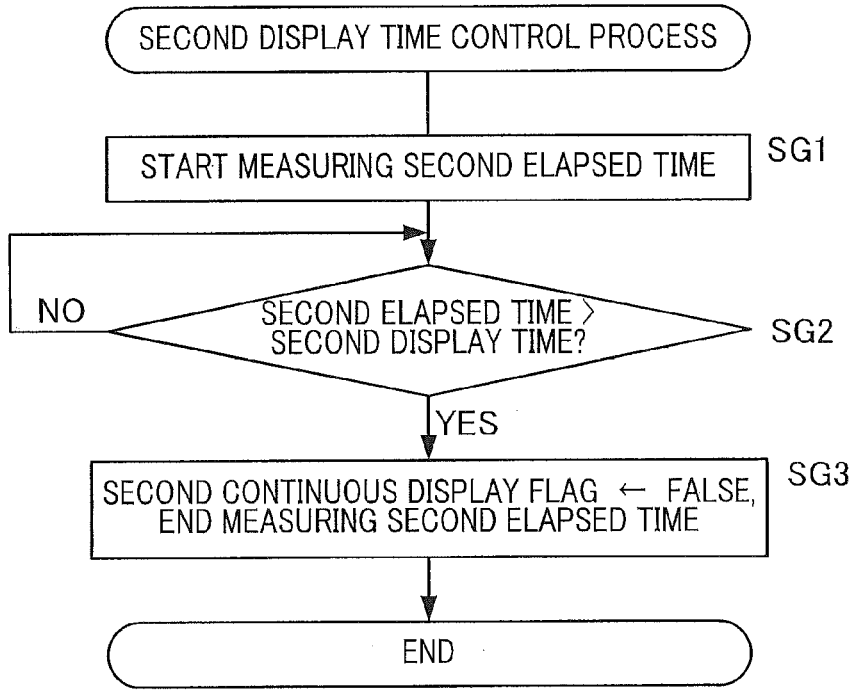
FIG. 13 is a flowchart showing a procedure of a second display time control process performed by the processor.

FIG. 13 is a flowchart showing a procedure of the second display time control process (SF4 in FIG. 12) performed by processor 28. In the second display time control process, processor 28 first starts measuring second elapsed time by timer 281 (SG1). The second elapsed time is elapsed time since the display of an icon corresponding to the second notification data was started. Processor 28 then determines whether the second elapsed time is longer than a predetermined second display time (SG2). In a case in which a result of the determination is NO, the process returns to Step SG2. On the other hand, in a case in which a result of the determination in Step SG2 is YES, processor 28 sets "false" to second continuous display flag 312, and stops measuring the second elapsed time (SG3), to end the second display time control process. In other words, second continuous display flag 312 is "true" only for the second display time.

Change Data Edit Request Process

The change data edit request process is a process performed at game terminal 20, and is started in a state in which the change data acquiring process, the recording medium ejection process, the game process, and the change data edit request process can be separately executed. Specifically, the change data edit request process is started when operation data is output from operation button group 24 while identification data of recording medium 50 is retained in RAM 31, the operation data indicating the start of an option change process of changing plural options to be displayed in option group image G1. In the option change process, an edit instruction indicating the details of the change is input to processor 28 via operation button group 24. Specifically, when the option change process is started, many candidates for options stored in ROM 29 are displayed on screen 221. By this display, the player of game terminal 20 can specify, by using operation button group 24, desired options as the plural options from among the many candidates for options displayed. In other words, processor 28 serves as a first option determiner that determines, as plural options, those specified manually by a player by using operation button group 24 from among many candidates for options stored in ROM 29. When a player finishes specifying options, the processor transmits to communication device 40 an edit request containing edit instruction data indicating the specified plural options and identification data retained in RAM 31. The change data edit request process then ends.

Change Data Edit Process

The change data edit process is a process performed at communication device 40, and is started when an edit request from one of game terminals 20 is received by receiver 41. Processor 41 is capable of executing plural change data edit processes in parallel. In the change data edit process, processor 41 receives an edit request supplied from receiver 41, and edits individual change data 461 retained in hard disk 46 in correspondence with identification data contained in this edit request in accordance with edit instruction data contained in this edit request. As a result, the details of changes indicated by individual change data 461 are changed. The change data edit process then ends.

Figure 20:
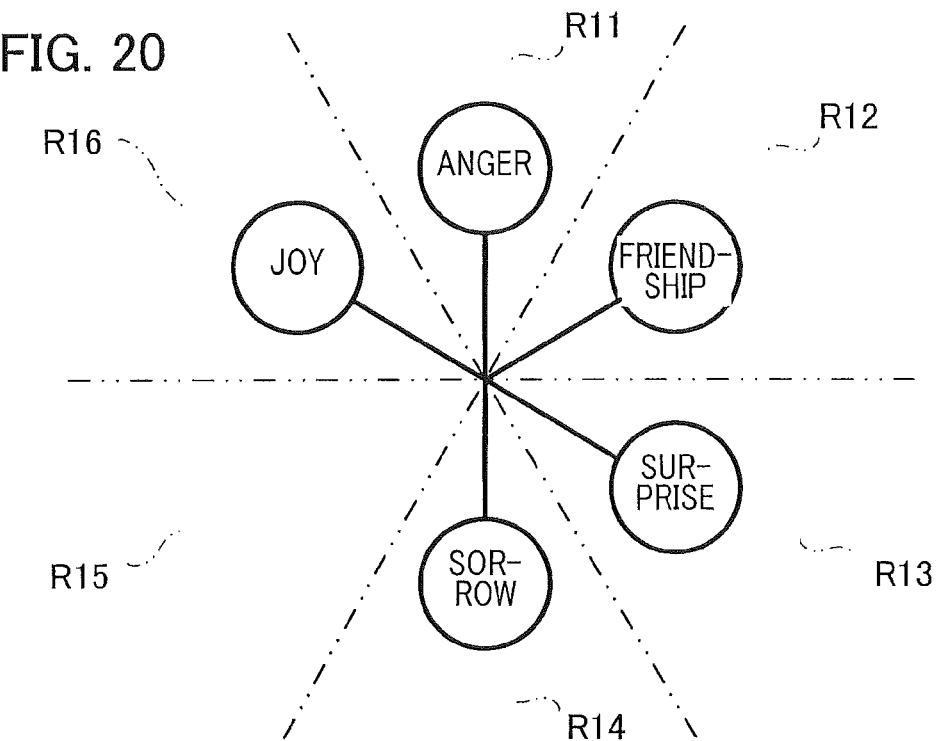
FIG. 20 is a diagram showing an example of the option group image.

We assume that thus edited individual change data 461 is delivered to game terminal 20 and is written in RAM 31 thereof as change data 321, and that the game process is started while this change data 321 is retained in RAM 31. In this case, an option group image displayed in a play of the first game will be something in which changes have been made to what is shown in FIG. 19. An example thereof is shown in FIG. 20. In this example, the image of an option corresponding to "greeting" is not displayed. Furthermore, direction range R15 corresponding to "greeting" will be a range corresponding to a null option.

Other Processes

Furthermore, in the play process, processor 28 of game terminal 20 switches between "predetermined option group images". Plural sets of option group image data each representing a predetermined option group image are available, and processor 28, in Step SA4, selects an option group image data to be used for the initialization of an option group image depending on a play situation of the first game. Accordingly, for example, an option group image displayed during a certain period after the goal and an option group image displayed during other periods are different from each other. Also, for example, an option group image displayed during a play-off period such as a half time and an option group image displayed during a play-on period are different from each other. Therefore, options (inputable input instructions) vary depending on the state of the play. Thus, the plural options displayed in an option group image are a part of many candidates for options, and processor 28 of game terminal 20 serves as a second option determiner that determines, as the plural options, those depending on the play situation of the first game from among many candidates for options.

SUMMARY

As has been described above, processor 28 of game terminal 20 serves as a position record processor that stores in RAM 31, from among detected position data output from touch panel 25, a position indicated by detected position data output by the start of a continuous touch operation as the position of a start point, and stores in RAM 31 a position indicated by detected position data output immediately before the end of the continuous touch operation as end position data indicating the position of an end point. Also, processor 28 serves as an identifier that performs an identifying process of identifying, based on start position data and end position data stored in RAM 31, one of the plural options as a user input instruction. The identifier preferably performs an identifying process of identifying, as a user input instruction, an option indicated by an option image of an input instruction displayed within a direction range that includes a direction from the start point to the end point therewithin, from among plural direction ranges having the start point of the continuous touch operation as basal point P, the user input instruction being identified from among plural input instructions corresponding respectively to plural direction ranges extending radially from a common basal point P of the contact face of touch panel 25 so as not to overlap with one another. Therefore, a user of game terminal 20 can input a desired input instruction simply by sweeping and lifting the fingertip touching the contact face.

Processor 28 selects an option in a case in which one of plural option images is associated with a direction range including a direction from the start point to the end point therewithin, and does not select an option in a case in which no option image is associated. In a case in which no option image is associated, the processor determines that a user input instruction has selected a null option. According to game system 10, even if the number of options displayed is reduced, the same option corresponds to the same direction range, and therefore, the erroneous input can be reduced.

Processor 28 performs the identifying process only in a case in which the distance between the start point and the end point is within a predetermined distance range. Therefore, because, according to game terminal 20, the determination is made not only based on a direction range but also on a distance range, the erroneous input can be reduced. Also, because the determination based on the direction range is performed after the determination is made based on the distance range, no determination is performed based on the direction range even in a case in which a player erroneously briefly touches the contact face. Therefore, the burden placed on game terminal 20 can be reduced.

Furthermore, processor 28 serves as a display unit 22 that displays an image on the contact face (screen 221) and as an option display controller that causes display unit 22 to display an option group image in which plural options each indicating each of plural input instructions are arranged one by one in plural direction ranges having the start point as the basal point during an option display period that is started when detected position data indicating the position of the start point is output from touch panel 25. Therefore, a user of game terminal 20 can easily and accurately select an option.

Furthermore, processor 28 serves as an operation button group 24 (input unit) and a background image generator that generates a background image (normal image and icon) used as the background of an option group image based on operation data output from operation button group 24. Furthermore, at game terminal 20, the above option display period ends when the permissible time passes since detected position data indicating the position of the end point was output from touch panel 25. Furthermore, processor 28 does not cause display unit 22 to display an option group image during a period other than the option display period. In other words, processor 28 serves as a background display controller that terminates the display of an option group image when detected position data indicating the position of an end point is output from touch panel 25, and that controls screen 22 to display a background image (a normal image and an icon) regardless of whether the option group image is being displayed. Therefore, according to game terminal 20, because the display of the option group image is terminated soon after detected position data indicating the position of an end point is output from touch panel 25, the period in which the background image is less visible can be shortened.

Furthermore, processor 28 generates a background image based on an input instruction that was input by using touch panel 25. Therefore, a user of game terminal 20 can confirm an input instruction that was input by the user. Furthermore, processor 28 serves as a transmitter that transmits first notification data to the outside and as a receiver that receives second notification data (first notification data transmitted by game terminal 20 of the opponent player) from game terminal 20 of the opponent player. Processor 28 also generates a background image (icon) based on the received second notification data. Therefore, the intention of a player can be visually conveyed between game terminals 20.

Additionally, the plural options are associated with plural icons that bring about mutually different visual effects when displayed, and processor 28 controls display unit 22 to display an icon corresponding to an option identified as a user input instruction. Therefore, a user of game system 10 can readily and accurately select an option. Processor 28 also serves as an association changer that changes association between options and icons, and as a first option determiner that determines, as the options to be presented, options that have been specified by the user from among the many candidates for options. Therefore, a user of game system 10 can customize the options to be presented. Also, processor 28 serves as a second option determiner that regards, as the plural options, options depending on a play situation of a computer game from among the many candidates for options. Therefore, a situation can be avoided in which icons inappropriate for a play situation are displayed.

Modifications

In the following, examples will be given of embodiments obtained by modifying the above embodiment.

For example, when detected position data is no longer output from touch panel 25, a continuous touch operation may be determined right away as having ended. Also, for example, the appropriate option may be identified without considering the distance range, or the appropriate option may be identified by making the determination based on the distance range after making the determination based on the direction range. Also, for example, a provisionally selected option does not have to be highlighted, and selection may be performed after the end of continuous touch operation without performing provisional selection.

Furthermore, for example, the present embodiment may be applied to a network-type, multiple-player type game other than a soccer game, or may be applied to a multiple-player type game other than a network-type game. A portion relating to the input of an input instruction of the present embodiment may be applied to a single-player type game, or may be applied to an input instruction processing device other than game devices such as an ATM (Automated Teller Machine). Therefore, the processor does not have to display an icon as a process corresponding to a user input instruction identified by processor 28. In other words, the processor only has to perform a predetermined process as a process corresponding to the selected option for input instruction. Furthermore, for example, an input unit other than touch panel 25 does not have to be provided.

For example, an option group image does not have to be displayed on the contact face. Specifically, the contact face may be arranged so that the contact face does not overlap a screen on which an option group image is to be displayed, or when an option group image does not have to be displayed. Even in a case in which an option group image is not displayed, a desired input instruction can be input if the number of the options is small enough (each direction range is large enough).

Also, for example, the display of an option group image may be terminated when the elapsed time from the start of a continuous touch operation reaches a certain length, regardless of the length of the continuous touch operation. Also, for example, a background image may be generated not based on a user input instruction, or a background image may be generated not based on second notification data. Also, for example, a touch panel for a touch pen may be used. Also, for example, the present invention can be implemented in a home-use game machine.

Also, for example, an icon selected using touch panel 25 of game terminal 20 does not have be displayed on display unit 22 of this game terminal 20. Also, for example, change data does not have to be used, i.e., customization by a user does not have to be accepted. Also, for example, options to be presented do not have to be changed depending on a play situation of the first game.

Also, for example, in a case in which the number of options to be presented is changed, the number of the direction ranges may be made the same as the number of the options to be presented so that there is no direction range with which options are not associated. For example, in a case in which the initial number of direction ranges and the options is 6, the initial angle of each direction range is 60 degrees, and in a case in which the number of options is changed to 3, the number of direction ranges is made 3, and the angle of each direction range is made 120 degrees. According to this embodiment, each direction range can be set larger.

According to the above-described embodiment, in Step SC4 shown in FIG. 9, the direction from the start point to the end point is identified based on start position data 316 and end position data 317, and in Step SC5, an option corresponding to a direction range including the direction toward the end point therewithin is provisionally selected. More specifically, the following option identifying process may be executed.

Figure 21:
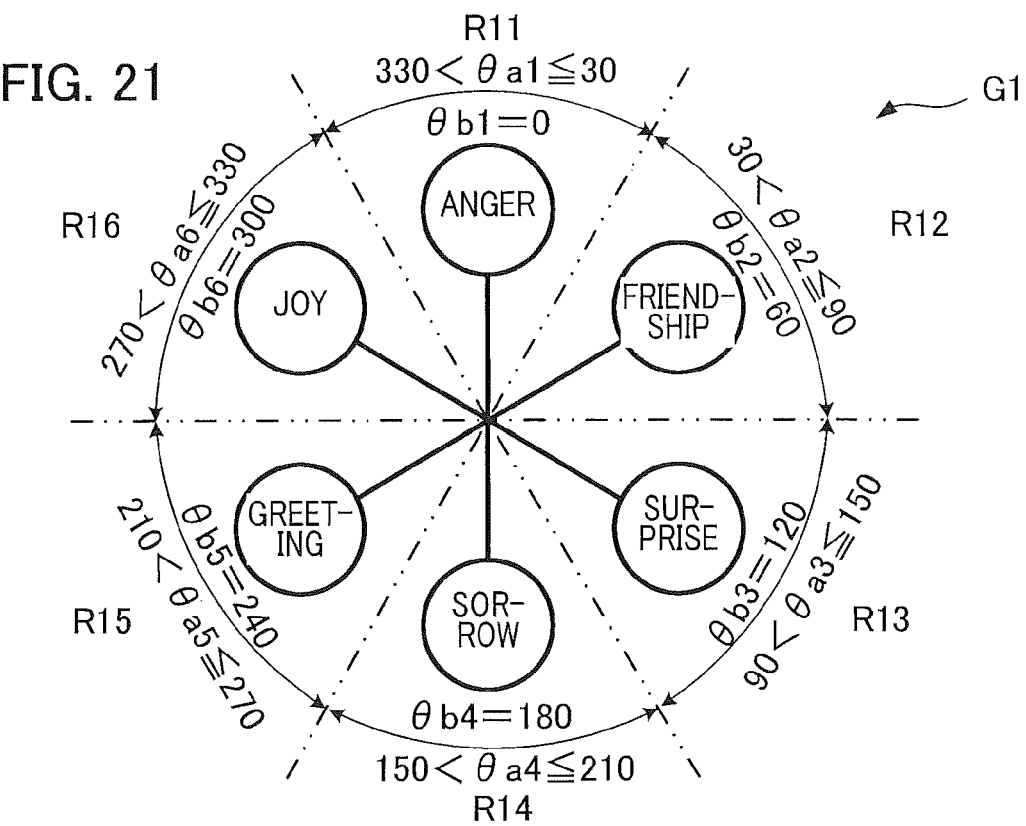
FIG. 21 is a diagram showing the ranges of angles and average angles.

Computer program 291 stored in ROM 29 has reference data indicating, as direction ranges, ranges of angles $\theta a$ of a polar coordinates system with reference to the start point and average angle data indicating the average angle of each of the ranges of angles. For example, in a case in which direction ranges R11 to R16 are assumed to be as shown in FIG. 18, the ranges of angles $\theta a1$ to $\theta a6$ and the average angles $\theta b1$ to $\theta b6$ are as shown in FIG. 21. ROM 29 serves as a storage device that stores the ranges of angles $\theta a1$ to $\theta a6$ and the average angles $\theta b1$ to $\theta b6$.

FIG. 22 is a flowchart showing an option identifying process. Processor 28 first calculates, based on start position data 316 and end position data 317, the angle $\theta c$ of an end point with reference to the start point (Step SH1). For example, provided that the start point is (x1, y1), that the end point is (x2, y2) in XY coordinates, that x3=x2−x1, and that y3=y2−y1, the angle $\theta c$ is obtained by $\theta c = COS\{y3/(x3^2+y3^2)^{1/2}\}^{-1}$.

Processor 28 then corrects the calculated angle $\theta c$ to generate the corrected angle $\theta d$ (Step SH2). This correction process will be described later.

Processor 28 then compares the corrected angle θd with the ranges of angles θa1 to θa6, to determine to which one of the ranges of angles θa1 to θa6 the corrected angle θd belongs (Step SH3). For example, in a case in which the corrected angle θd is 77 degrees, it is determined that θd belongs to the range of angle θa2. As a result, processor 28 determines an option corresponding to the range of angle θa2 (Step SH4). In the above example, "friendship" is identified.

Processor 28 then stores in RAM 31 the difference between angle θc and the average angle θb of the range of angle θa which is determined as being belonged to. In the above example, because θc=77, and θb=60, the difference will be "17", and this will be stored in RAM 31 as the difference data.

In the correction process in Step SH2, processor 28 reads every difference data stored in RAM 31, and the average thereof will be calculated as the correction angle θe. The correction using the correction angle θe is performed on angle θc to generate the corrected angle θd. Specifically, θd=θc−θe.

A user's touch operation is performed between operations of operation button group 24, and is performed over a short time by sweeping a finger. Therefore, an erroneous input can take place depending on the tendency in the movement of a user's finger. For example, a user who moves a finger inclined in a clockwise rotated angle tends to input "surprise" as an option by mistake instead of inputting "friendship" as an option.

However, by executing the correction process, mistaken inputs can be reduced. For example, in a case in which the correction angle θe is 15 degrees, the range of angles for which "friendship" is determined as the selected option actually is a range from 45 to 105 degrees. Therefore, the mistaken inputs can be reduced even in a case in which a user moves a finger inclined in a clockwise rotated angle.

In an example shown in FIG. 22, the average of differences is calculated in Step SH2, but the correction angle θe may be calculated after Step SH5 for storage into RAM 31, and in Step SH2, correction angle θe may be used after reading it from RAM 31.

Furthermore, the correction angle θe may be stored in a non-volatile memory in association with a user. For example, in a case in which a user uses a card for identifying an individual when the user performs a play, the correction angle θe may be stored in the card. Also, in a case in which a password or information identifying an individual is input prior to the start of the play, such information and the correction angle θe may be stored in association with each other at game device 20. Alternatively, via a communication line, such information and the correction angle θe may be stored in association with each other at a server. The correction angle θe may be read prior to the start of the play, and the correction angle θe may be generated again based on the correction angle θe that is a result of a play up to the previous time and the difference data in the current play, for storage.

What is claimed:

1. An input instruction processing device for performing a process in accordance with a user input instruction from a user, the input instruction processing device comprising:
   a storage device that stores written data;
   a touch panel that has a planar contact face and that, in a case in which a touch operation is performed by the user by touching the contact face, detects a position of a portion in the contact face touched by the touch operation to output detected position data corresponding to the detected position;
   a display that displays an image on the contact face;
   a position record processor that causes the storage device to store, as start position data, a position indicated by the detected position data output from the touch panel corresponding to a start point of a continuous touch operation and that causes the storage device to store, as end position data, a position indicated by the detected position data output from the touch panel immediately before the continuous touch operation ends corresponding to an end point, the continuous touch operation being a touch operation in which the contact at the contact face continues from the start point to the end point;
   an option display controller that controls the display to display an option group image in which plural option images corresponding to plural options are arranged around a position indicated by the start position data stored in the storage device, each option image corresponding to an option of an input instruction that is input by the user and each of the option images being displayed in at least two of plural direction ranges, with the plural direction ranges extending radially from the start point that is a common basal point so as not to overlap with one another and corresponding to ranges of angles of polar coordinates with reference to the start point;
   an identifier that performs an identifying process of identifying one of the plural options as the user input instruction based on the start position data and the end position data stored in the storage device, the identified option corresponding to a direction range that includes a direction from the start point to the end point; and
   a first input instruction processor that performs a process in accordance with the user input instruction identified by the identifier,
   the identifier comprising:
      a range storage device that stores each of the ranges of angles for each of the plural options;
      a calculator that calculates, on the basis of the start position data and the end position data, the angle of the end point with reference to the start point;
      a corrector that corrects the angle calculated by the calculator;
      a determiner that, by comparing the angle corrected by the corrector and each of the ranges of the angles stored in the range storage device, determines which of the ranges of the angles the corrected angle belongs to; and
      a decider that identifies, based on a result of the determination of the determiner, an option represented by the option image as the user input instruction,
   wherein the corrector calculates, for each of a plurality of continuous touch operations, a difference between the angle calculated by the calculator and an average angle of the range of the angle to which it is determined by the determiner that the corrected angle belongs, calculates the average of the differences calculated for each of the plurality of continuous touch operations as a correction angle, and corrects the angle calculated by the calculator by using the correction angle.

2. An input instruction processing device according to claim 1,
   wherein the identifier performs the identifying process only in a case in which the distance between the start point and the end point falls within a predetermined distance range.

3. An input instruction processing device according to claim 1,
   wherein the plural options are associated with plural icons that cause visual effects that are different from one another when the icons are displayed; and wherein the first input instruction processor controls the display to display an icon corresponding to the option identified by the user input instruction.

4. An input instruction processing device according to claim 1,
wherein, during a period in which the continuous touch operation is continuing, the touch panel sequentially outputs plural sets of detection position data showing plural detected positions on a path that the continuous touch operation has followed,
the input instruction processing device further comprising:
a timer that measures an elapsed time since the touch panel most recently output the detected position data;
a timer controller that causes the timer to start measuring the elapsed time every time detected position data is output from the touch panel;
a provisional position record processor that updates a position indicated by the detected position data in the storage device in a case in which the detected position data is output from the touch panel after the start position data is stored in the storage device; and
an end determiner that determines that the continuous touch operation has ended in a case in which the elapsed time exceeds a predetermined permissible time,
wherein the position record processor, in a case in which it is determined by the end determiner that the continuous touch operation has ended, determines the position stored in the storage device by the provisional position record processor as the detected position data that is output immediately before the continuous touch operation ends.

5. An input instruction processing device according to claim 1, further comprising:
an input unit, different from the touch panel, configured to input information from the user;
a background image generator that generates a background image based on the information input by the input unit, the background image being displayed as a background of the option group image; and
a background display controller that controls the display to stop displaying the option group image in a case in which detected position data corresponding to the end position data is output from the touch panel and to display the background image regardless of whether the option group image is displayed.

6. An input instruction processing device according to claim 5,
wherein the plural options are associated with plural icons that cause visual effects that are different from one another when the icons are displayed; and
wherein the background image generator generates the background image including at least one of the plural icons based on the user input instruction identified by the identifier in addition to the information received by the input unit.

7. An input instruction processing device according to claim 5, further comprising:
a transmitter that transmits, to an external unit, data corresponding to the user input instruction identified by the identifier; and
a receiver that receives data from the external unit,
wherein the background image generator generates the background image based on the data received by the receiver in addition to the information input to the input unit.

8. An input instruction processing device according to claim 1,
wherein the identifier, in a case in which any of the plural option images is not associated with a direction range including the direction from the start point to the end point, determines that the user input instruction has selected a null option.

9. An input instruction processing device according to claim 1,
wherein the input instruction processing device further comprises an association changer that changes association between options and icons.

10. An input instruction processing device according to claim 1,
wherein the plural options are a part of many candidates for options; and
wherein the input instruction processing device further comprises an option determiner that determines, as the plural options, options that have been specified by the user from among the many candidates for options.

11. An input instruction processing device according to claim 1,
wherein the plural options are a part of many candidates for options; and
wherein the input instruction processing device is a game terminal of a computer game and further comprises an option determiner that determines, as the plural options, options that match a play situation of the computer game from among the many candidates for options.

12. A communication system comprising:
plural input instruction processing devices according to claim 1,
each of the plural input instruction processing devices further comprising:
a transmitter that transmits, to another input instruction processing device of the plural input instruction processing devices, data corresponding to the user input instruction identified by the identifier as first notification data;
a receiver that receives, from the another input instruction processing device, second notification data corresponding to a user input instruction of the another input instruction processing device; and
a second input instruction processor that performs a process in accordance with the user input instruction of the another input instruction processing device shown by the second notification data received by the receiver.

13. A computer implemented method for causing a computer to perform a process in accordance with a user input instruction from a user, the computer having a storage device that stores written data and being connected to a touch panel and to a display, with the touch panel having a planar contact face and the touch panel, in a case in which a touch operation is performed by the user by touching the contact face, detecting a position of a portion in the contact face contacted by the touch operation to output detected position data corresponding to the detected position, and the display displaying an image on the contact face, to execute:
a position record process of causing the storage device to store, as start position data, a position indicated by the detected position data output from the touch panel corresponding to a start point of a continuous touch operation and that causes the storage device to store, as end position data, a position indicated by the detected position data output from the touch panel immediately before the continuous touch operation ends corresponding to an end point, the continuous touch operation being a touch operation in which the contact at the contact face continues from the start point to the end point;

an option display control process of controlling the display to display an option group image in which plural option images corresponding to plural options are arranged around a position indicated by the start position data stored in the storage device, each option image corresponding to an option of an input instruction that is input by the user, and each of the option images being displayed in at least two of plural direction ranges, with the plural direction ranges extending radially from the start point that is a common basal point so as not to overlap with one another and corresponding to ranges of angles of polar coordinates with reference to the start point, the storage device storing each of the ranges of angles for each of the plural options;

an identifying process of identifying one of the plural options as the user input instruction based on the start position data and the end position data stored in the storage device, the identified option corresponding to a direction range that includes a direction from the start point to the end point; and a first input instruction process of performing a process in accordance with the user input instruction identified in the identifying process, wherein the identifying process includes:
calculating by a calculator, on the basis of the start position data and the end position data, the angle of the end point with reference to the start point;
correcting by a corrector the angle calculated by the calculator;
determining which of the ranges of the angles the corrected angle belongs to by comparing the angle corrected by the corrector and each of the ranges of the angles stored in the storage device; and
identifying an option represented by the option image as the user input instruction based on a result of the determination,
wherein the correction includes calculating, for each of a plurality of continuous touch operations, a difference between the angle calculated by the calculator and an average angle of the range of the angle to which it is determined by the determiner that the corrected angle belongs, calculating the average of the differences calculated for each of the plurality of continuous touch operations as a correction angle, and correcting the angle calculated by the calculator by using the correction angle.

14. A non-transitory information recording medium having stored therein a computer program for causing a computer to perform a process in accordance with a user input instruction from a user, the computer having a storage device that stores written data and being connected to a touch panel and to a display, with the touch panel having a planar contact face and the touch panel, in a case in which a touch operation is performed by the user by touching the contact face, detecting a position of a portion in the contact face contacted by the touch operation to output detected position data corresponding to the detected position, and the display displaying an image on the contact face, to execute:

a position record process of causing the storage device to store, as start position data, a position indicated by the detected position data output from the touch panel corresponding to a start point of a continuous touch operation and that causes the storage device to store, as end position data, a position indicated by the detected position data output from the touch panel immediately before the continuous touch operation ends corresponding to an end point, the continuous touch operation being a touch operation in which the contact at the contact face continues from the start point to the end point;

an option display control process of controlling the display to display an option group image in which plural option images corresponding to plural options are arranged around a position indicated by the start position data stored in the storage device, each option image corresponding to an option of an input instruction that is input by the user, and each of the option images being displayed in at least two of plural direction ranges, with the plural direction ranges extending radially from the start point that is a common basal point so as not to overlap with one another and corresponding to ranges of angles of polar coordinates with reference to the start point, the storage device storing each of the ranges of angles for each of the plural options;

an identifying process of identifying one of the plural options as the user input instruction based on the start position data and the end position data stored in the storage device, the identified option corresponding to a direction range that includes a direction from the start point to the end point; and a first input instruction process of performing a process in accordance with the user input instruction identified in the identifying process, wherein the identifying process includes:
calculating by a calculator, on the basis of the start position data and the end position data, the angle of the end point with reference to the start point;
correcting by a corrector the angle calculated by the calculator;
determining which of the ranges of the angles the corrected angle belongs to by comparing the angle corrected by the corrector and each of the ranges of the angles stored in the storage device; and
identifying an option represented by the option image as the user input instruction based on a result of the determination,
wherein correcting the angle includes calculating, for each of a plurality of continuous touch operations, a difference between the angle calculated by the calculator and an average angle of the range of the angle to which it is determined by the determiner that the corrected angle belongs, calculating the average of the differences calculated for each of the plurality of continuous touch operations as a correction angle, and correcting the angle calculated by the calculator by using the correction angle.

15. An input instruction processing device for performing a process in accordance with a user input instruction from a user, the input instruction processing device comprising:
a processor configured to:
calculate, on a basis of a start position data corresponding to a start point of a continuous touch operation performed by touching a contact face of a touch panel by the user, and an end position data corresponding to an end point of the continuous touch operation ends, an angle of the end point with reference to the start point;
correct the calculated angle;
compare the corrected angle and each of a plurality of ranges of angles stored in a storage device, the ranges of angles are ranges of polar coordinates with reference to the start point as a common basal point, and each of the ranges of angles corresponding to one of a plurality of options that is selectable by the user;

determine which of the ranges of the angles the corrected angle belongs to; and identify, based on a result of the determination, an option among the plurality of options as the user input instruction, wherein correcting the calculated angle comprises:
calculating a difference between the calculated angle and an average angle of the range of the angle to which the corrected angle belongs;
calculating an average of the differences calculated for each of a plurality of continuous touch operations as a correction angle, and
correcting the calculated angle by using the correction angle.

16. A computer implemented method for causing a computer to perform a process in accordance with a user input instruction from a user, the method comprising:

calculating, on a basis of a start position data corresponding to a start point of a continuous touch operation performed by touching a contact face of a touch panel by the user, and an end position data corresponding to an end point of the continuous touch operation ends, an angle of the end point with reference to the start point;

correcting the calculated angle;

comparing the corrected angle and each of a plurality of ranges of angles stored in a storage device, the ranges of angles are ranges of polar coordinates with reference to the start point as a common basal point, and each of the ranges of angles corresponding to one of a plurality of options that is selectable by the user;

determining which of the ranges of the angles the corrected angle belongs to; and identifying, based on a result of the determining, an option among the plurality of options as the user input instruction, wherein correcting the calculated angle comprises:
calculating a difference between the calculated angle and an average angle of the range of the angle to which the corrected angle belongs;
calculating an average of the differences calculated for each of a plurality of continuous touch operations as a correction angle, and
correcting the calculated angle by using the correction angle.

17. A non-transitory information recording medium having stored therein a computer program for causing a computer to perform a method in accordance with a user input instruction from a user, the method comprising:

calculating, on a basis of a start position data corresponding to a start point of a continuous touch operation performed by touching a contact face of a touch panel by the user, and an end position data corresponding to an end point of the continuous touch operation ends, an angle of the end point with reference to the start point;

correcting the calculated angle;

comparing the corrected angle and each of a plurality of ranges of angles stored in a storage device, the ranges of angles are ranges of polar coordinates with reference to the start point as a common basal point, and each of the ranges of angles corresponding to one of a plurality of options that is selectable by the user;

determining which of the ranges of the angles the corrected angle belongs to; and identifying, based on a result of the determining, an option among the plurality of options as the user input instruction, wherein correcting the calculated angle comprises:
calculating a difference between the calculated angle and an average angle of the range of the angle to which the corrected angle belongs;
calculating an average of the differences calculated for each of a plurality of continuous touch operations as a correction angle, and
correcting the calculated angle by using the correction angle.

* * * * *